(12) United States Patent
Asami et al.

(10) Patent No.: US 7,843,652 B2
(45) Date of Patent: Nov. 30, 2010

(54) WIDE-ANGLE IMAGING LENS

(75) Inventors: Taro Asami, Saitama (JP); Ryoko Otomo, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 202 days.

(21) Appl. No.: 11/583,110

(22) Filed: Oct. 19, 2006

(65) Prior Publication Data

US 2007/0091458 A1    Apr. 26, 2007

(30) Foreign Application Priority Data

Oct. 21, 2005    (JP) ............................. P2005-306771

(51) Int. Cl.
G02B 13/04    (2006.01)
G02B 9/12    (2006.01)
G02B 13/18    (2006.01)

(52) U.S. Cl. ...................... 359/753; 359/784; 359/716

(58) Field of Classification Search ......... 359/749–753, 359/784, 713–716
See application file for complete search history.

(56) References Cited

U.S. PATENT DOCUMENTS

| | | | |
|---|---|---|---|
| 6,504,655 B2 | 1/2003 | Shibayama | |
| 7,110,188 B2* | 9/2006 | Matsui et al. | 359/714 |
| 7,301,578 B2* | 11/2007 | Ohzawa et al. | 348/340 |
| 7,420,609 B2 | 9/2008 | Yamaguchi et al. | |
| 2001/0040736 A1 | 11/2001 | Shibayama | |
| 2004/0240080 A1 | 12/2004 | Matsui et al. | |
| 2004/0257677 A1* | 12/2004 | Matsusaka | 359/783 |
| 2005/0007481 A1 | 1/2005 | Yamaguchi et al. | |
| 2006/0087747 A1* | 4/2006 | Ohzawa et al. | 359/749 |
| 2006/0187557 A1* | 8/2006 | Yamakawa | 359/771 |
| 2006/0227434 A1* | 10/2006 | Hirose et al. | 359/749 |

FOREIGN PATENT DOCUMENTS

| | | |
|---|---|---|
| CN | 1573407 | 2/2005 |
| CN | 1576939 | 2/2005 |
| JP | 7-72382 A | 3/1995 |
| JP | 11-119094 | 4/1999 |
| JP | 2001-337268 A | 12/2001 |
| JP | 2002-244031 A | 8/2002 |
| JP | 2005181596 A | 7/2005 |
| JP | 2005-321742 A | 11/2005 |
| JP | 2006126418 A | 5/2006 |
| JP | 2006162829 A | 6/2006 |
| JP | 2006-184385 A | 7/2006 |
| TW | 508451 | 11/2002 |
| TW | 535002 | 6/2003 |

* cited by examiner

*Primary Examiner*—Jordan M. Schwartz
(74) *Attorney, Agent, or Firm*—Birch, Stewart, Kolasch & Birch, LLP

(57) ABSTRACT

A wide-angle imaging lens is provided and includes: a first lens, a second lens, and a third lens in this order from the object side. The first lens is a negative meniscus and has a convex surface on the object side; the second lens, at least one surface of which is an aspherical surface; and the third lens is a positive lens and has a convex surface on the image side and at least one surface of the third lens is an aspherical surface. The first len is made of a material having an Abbe number of 40 or more and the third lens is made of a material having an Abbe number of 50 or more. An aperture stop is disposed between the second lens and the third lens.

19 Claims, 37 Drawing Sheets

FIG. 14

| | BASIC LENS DATE OF EXAMPLE 1 | | | | |
|---|---|---|---|---|---|
| | Si SURFACE NO. | Ri RADIUS OF CURVATURE | Di SURFACE INTERVAL | Ndj REFRACTIVE INDEX | vdj ABBE NUMBER |
| L1 | 1 | 18.96 | 1.00 | 1.51680 | 64.2 |
| | 2 | 4.79 | 2.55 | | |
| L2 | 3 | -1.87 | 1.78 | 1.50869 | 56.0 |
| | 4 | 45.50 | 1.99 | | |
| L3 | 5 | 2.16 | 2.27 | 1.50869 | 56.0 |
| | 6 | -1.83 | | | |

FIG. 15 (A)

| ASPHERICAL SURFACE DATA AND DIFFRACTING SURFACE DATA OF EXAMPLE 1 | | | | |
|---|---|---|---|---|
| ASPHERICAL COEFFICIENT | SURFACE NO. | | | |
| | 3RD SURFACE | 4TH SURFACE | 5TH SURFACE | 6TH SURFACE |
| KA | -4.506222 | -8.11153E+11 | -262.4281034 | -12.2683011 |
| $B_3$ | 0.070121 | 0.15606 | 0.458652 | -0.13675 |
| $B_4$ | -0.02179 | -0.06308 | -0.34837 | 0.039319 |
| $B_5$ | 0.0040424 | 0.072987 | -0.105954 | -0.001277 |
| $B_6$ | -0.00034 | -0.0168 | 0.210356 | 0.02327 |

FIG. 15 (B)

| DATA RELATING TO PARAMETERS IN CONFITION FORMULAE OF EXAMPLE 1 | | | |
|---|---|---|---|
| f | 1.26 | $f_1$ | -12.71 |
| 2ω | 153° | L/BF OF CONDITION FORMULA (1) | 4.56 |
| L (IN AIR) | 12.26 | $|f_1/f|$ OF CONDITION FORMULA (2) | 10.08 |
| BF (IN AIR) | 2.67 | L/2ωx OF CONDITION FORMUAL (3) | 2.04 |

FIG. 16

| | BASIC LENS DATE OF EXAMPLE 2 | | | | |
|---|---|---|---|---|---|
| | Si<br>SURFACE<br>NO. | Ri<br>RADIUS OF<br>CURVATURE | Di<br>SURFACE<br>INTERVAL | Ndj<br>REFRACTIVE<br>INDEX | vdj<br>ABBE<br>NUMBER |
| L1 | 1 | 15.96 | 1.00 | 1.51680 | 64.2 |
| | 2 | 4.79 | 1.75 | | |
| L2 | 3 | -2.03 | 1.82 | 1.50869 | 56.0 |
| | 4 | 45.50 | 0.67 | | |
| L3 | 5 | 3.79 | 1.82 | 1.50869 | 56.0 |
| | 6 | -1.22 | | | |

FIG. 17 (A)

| ASPHERICAL SURFACE DATA AND DIFFRACTING SURFACE DATA OF EXAMPLE 2 | | | | |
|---|---|---|---|---|
| ASPHERICAL COEFFICIENT | SURFACE NO. | | | |
|  | 3RD SURFACE | 4TH SURFACE | 5TH SURFACE | 6TH SURFACE |
| KA | -8.3527807 | -1.02219E+12 | -374.592129 | -9.7163366 |
| $B_3$ | 0.043352 | 0.283419 | 0.193949 | -0.3739 |
| $B_4$ | -0.00378 | -0.11872 | -0.25373 | 0.120628 |
| $B_5$ | -0.001479 | 0.102267 | 0.1795837 | 0.0203297 |
| $B_6$ | 0.000241 | -0.04572 | -0.01038 | -0.00211 |

FIG. 17 (B)

| DATA RELATING TO PARAMETERS IN CONFITION FORMULAE OF EXAMPLE 2 | | | |
|---|---|---|---|
| f | 1.47 | $f_1$ | -13.66 |
| 2ω | 160° | L/BF OF CONDITION FORMULA (1) | 3.72 |
| L (IN AIR) | 9.67 | $|f_1/f|$ OF CONDITION FORMULA (2) | 9.29 |
| BF (IN AIR) | 2.60 | L/2ωx OF CONDITION FORMUAL (3) | 1.54 |

FIG. 18

| | BASIC LENS DATE OF EXAMPLE 3 | | | |
|---|---|---|---|---|
| Si SURFACE NO. | Ri RADIUS OF CURVATURE | Di SURFACE INTERVAL | Ndj REFRACTIVE INDEX | vdj ABBE NUMBER |
| L1 { 1 | 19.14 | 1.21 | 1.77250 | 49.6 |
| 2 | 3.55 | 2.85 | | |
| L2 { 3 | -3.06 | 2.53 | 1.50869 | 56.0 |
| 4 | -2.30 | 1.52 | | |
| L3 { 5 | -111.36 | 1.70 | 1.50869 | 56.0 |
| 6 | -1.73 | | | |

FIG. 19 (A)

| ASPHERICAL SURFACE DATA AND DIFFRACTING SURFACE DATA OF EXAMPLE 3 | | | | |
|---|---|---|---|---|
| ASPHERICAL COEFFICIENT | SURFACE NO. | | | |
| | 3RD SURFACE | 4TH SURFACE | 5TH SURFACE | 6TH SURFACE |
| $KA$ | -7.964003 | -0.7099872 | -993129.5522 | -1.769708 |
| $B_3$ | -0.01874 | 0.044053 | 0.061504 | -0.04445 |
| $B_4$ | 0.007611 | -0.00608 | -0.16578 | 0.027442 |
| $B_5$ | -0.001143 | -0.002007 | 0.1034197 | -0.027266 |
| $B_6$ | 0.0002 | 0.000734 | 0.067726 | 0.004128 |
| $B_7$ | -5E-05 | -0.00081 | -0.00463 | 0.00278 |
| $B_8$ | 3.29E-05 | 0.000229 | -0.0264 | 0.001215 |
| $B_9$ | 1.5E-05 | 0.000264 | -0.02364 | 0.001365 |
| $B_{10}$ | -4.9E-06 | -0.00011 | 0.017321 | 0.001518 |

FIG. 19 (B)

| DATA RELATING TO PARAMETERS IN CONFITION FORMULAE OF EXAMPLE 3 | | | |
|---|---|---|---|
| $f$ | 1.54 | $f_1$ | -5.83 |
| $2\omega$ | 167° | L/BF OF CONDITION FORMULA (1) | 4.16 |
| L (IN AIR) | 12.90 | $|f_1/f|$ OF CONDITION FORMULA (2) | 3.79 |
| BF (IN AIR) | 3.10 | L/2ωx OF CONDITION FORMUAL (3) | 1.97 |

FIG. 20

| | BASIC LENS DATE OF EXAMPLE 4 | | | |
|---|---|---|---|---|
| Si SURFACE NO. | Ri RADIUS OF CURVATURE | Di SURFACE INTERVAL | Ndj REFRACTIVE INDEX | vdj ABBE NUMBER |
| L1 { 1 | 38.07 | 1.41 | 1.77250 | 49.6 |
| 2 | 3.81 | 2.27 | | |
| L2 { 3 | -2.42 | 1.50 | 1.50869 | 56.0 |
| 4 | -2.92 | 1.98 | | |
| L3 { 5 | -555.18 | 2.20 | 1.50869 | 56.0 |
| 6 | -1.44 | | | |

FIG. 21 (A)

| ASPHERICAL SURFACE DATA AND DIFFRACTING SURFACE DATA OF EXAMPLE 4 | | | | |
|---|---|---|---|---|
| ASPHERICAL COEFFICIENT | SURFACE NO. | | | |
| | 3RD SURFACE | 4TH SURFACE | 5TH SURFACE | 6TH SURFACE |
| $KA$ | -9.2637491 | -0.9010493 | -485028008.3 | -1.2380315 |
| $B_3$ | 0.016438 | 0.084196 | -0.00068 | -0.04283 |
| $B_4$ | 0.00555 | -0.0059 | -0.07347 | 0.00035 |
| $B_5$ | -0.000965 | -0.004959 | 0.0465437 | -0.03837 |
| $B_6$ | 4.84E-06 | 0.001868 | -0.02437 | 0.01219 |
| $B_7$ | -4.4E-05 | -0.00039 | 0.003215 | 0.00861 |
| $B_8$ | 6.46E-06 | -0.00021 | 0.081335 | -0.00043 |
| $B_9$ | 5.48E-06 | -2.9E-05 | 0.022569 | -0.0033 |
| $B_{10}$ | -0.00018 | 0.000675 | 0.012125 | 0.002387 |

FIG. 21 (B)

| DATA RELATING TO PARAMETERS IN CONFITION FORMULAE OF EXAMPLE 4 | | | |
|---|---|---|---|
| f | 1.44 | $f_1$ | -5.58 |
| 2ω | 169° | L/BF OF CONDITION FORMULA (1) | 3.76 |
| L (IN AIR) | 12.80 | $|f_1/f|$ OF CONDITION FORMULA (2) | 3.87 |
| BF (IN AIR) | 3.40 | L/2ωx OF CONDITION FORMUAL (3) | 1.93 |

FIG. 22

| | Si SURFACE NO. | Ri RADIUS OF CURVATURE | Di SURFACE INTERVAL | Ndj REFRACTIVE INDEX | vdj ABBE NUMBER |
|---|---|---|---|---|---|
| | \multicolumn{5}{c}{BASIC LENS DATE OF EXAMPLE 5} |
| L1 | 1 | 25.85 | 1.20 | 1.77250 | 49.6 |
| L1 | 2 | 4.75 | 2.51 | | |
| L2 | 3 | -3.24 | 3.13 | 1.50869 | 56.0 |
| L2 | 4 | -2.90 | 1.27 | | |
| L3 | 5 | -24.82 | 1.81 | 1.50869 | 56.0 |
| L3 | 6 | -1.43 | | | |

FIG. 23 (A)

| ASPHERICAL SURFACE DATA AND DIFFRACTING SURFACE DATA OF EXAMPLE 5 | | | | |
|---|---|---|---|---|
| ASPHERICAL COEFFICIENT | SURFACE NO. | | | |
| | 3RD SURFACE | 4TH SURFACE | 5TH SURFACE | 6TH SURFACE |
| KA | -10.7269688 | -0.7255076 | -356621.2927 | -0.4573886 |
| $B_3$ | -0.00754 | 0.035922 | 0.046093 | 0.032467 |
| $B_4$ | -0.00116 | 0.005976 | -0.1553 | -0.04164 |
| $B_5$ | 0.0005459 | -0.001956 | 0.1073762 | -0.009553 |
| $B_6$ | 0.002449 | -0.00441 | 0.06984 | 0.026788 |
| $B_7$ | -0.00039 | -0.00152 | -0.00146 | 0.003539 |
| $B_8$ | -0.00106 | 0.003122 | -0.02349 | -0.01005 |
| $B_9$ | 0.000551 | 0.001378 | -0.02379 | -0.00551 |
| $B_{10}$ | -8E-05 | -0.00142 | 0.011931 | 0.008058 |

FIG. 23 (B)

| DATA RELATING TO PARAMETERS IN CONFITION FORMULAE OF EXAMPLE 5 | | | |
|---|---|---|---|
| f | 1.43 | $f_1$ | -7.72 |
| 2ω | 168° | L/BF OF CONDITION FORMULA (1) | 4.44 |
| L (IN AIR) | 12.80 | $|f_1/f|$ OF CONDITION FORMULA (2) | 5.40 |
| BF (IN AIR) | 2.88 | L/2ωx OF CONDITION FORMUAL (3) | 1.94 |

FIG. 24

| | BASIC LENS DATE OF EXAMPLE 6 | | | | |
|---|---|---|---|---|---|
| | Si SURFACE NO. | Ri RADIUS OF CURVATURE | Di SURFACE INTERVAL | Ndj REFRACTIVE INDEX | vdj ABBE NUMBER |
| L1 | 1 | 37.84 | 1.41 | 1.77250 | 49.6 |
| L1 | 2 | 3.76 | 2.25 | | |
| L2 | 3 | -2.40 | 1.51 | 1.50869 | 56.0 |
| L2 | 4 | -2.90 | 1.98 | | |
| L3 | 5 | -274.91 | 2.19 | 1.50869 | 56.0 |
| L3 | 6 | -1.45 | | | |

FIG. 25 (A)

| ASPHERICAL SURFACE DATA AND DIFFRACTING SURFACE DATA OF EXAMPLE 6 | | | | |
|---|---|---|---|---|
| ASPHERICAL COEFFICIENT | SURFACE NO. | | | |
| | 3RD SURFACE | 4TH SURFACE | 5TH SURFACE | 6TH SURFACE |
| KA | -9.1358667 | -0.9017103 | -236404042.3 | -1.255439 |
| $B_3$ | 0.016297 | 0.084184 | -0.00081 | -0.04222 |
| $B_4$ | 0.00554 | -0.00589 | -0.07285 | 0.00041 |
| $B_5$ | -0.000966 | -0.004956 | 0.047638 | -0.038386 |
| $B_6$ | 5.25E-06 | 0.00187 | -0.0232 | 0.012169 |
| $B_7$ | -4.4E-05 | -0.00039 | 0.003956 | 0.008595 |
| $B_8$ | 6.53E-06 | -0.00021 | 0.080971 | -0.00044 |
| $B_9$ | 5.5E-06 | -2.9E-05 | 0.020129 | -0.0033 |
| $B_{10}$ | -2.5E-06 | 3.37E-05 | -0.32624 | -0.00022 |

FIG. 25 (B)

| DATA RELATING TO PARAMETERS IN CONFITION FORMULAE OF EXAMPLE 6 | | | |
|---|---|---|---|
| f | 1.45 | $f_1$ | -5.51 |
| 2ω | 168° | L/BF OF CONDITION FORMULA (1) | 3.70 |
| L (IN AIR) | 12.80 | $|f_1/f|$ OF CONDITION FORMULA (2) | 3.80 |
| BF (IN AIR) | 3.46 | L/2ωx OF CONDITION FORMUAL (3) | 1.94 |

FIG. 26

| | BASIC LENS DATE OF EXAMPLE 7 | | | | |
|---|---|---|---|---|---|
| | Si<br>SURFACE<br>NO. | Ri<br>RADIUS OF<br>CURVATURE | Di<br>SURFACE<br>INTERVAL | Ndj<br>REFRACTIVE<br>INDEX | vdj<br>ABBE<br>NUMBER |
| L1 | 1 | 13.97 | 1.22 | 1.77250 | 49.6 |
| | 2 | 3.43 | 3.50 | | |
| L2 | 3 | -2.19 | 1.59 | 1.50869 | 56.0 |
| | 4 | -1.93 | 1.80 | | |
| L3 | 5 | 11.58 | 1.93 | 1.50869 | 56.0 |
| | 6 | -1.82 | | | |

FIG. 27 (A)

| ASPHERICAL SURFACE DATA AND DIFFRACTING SURFACE DATA OF EXAMPLE 7 | | | | |
|---|---|---|---|---|
| ASPHERICAL COEFFICIENT | SURFACE NO. | | | |
| | 3RD SURFACE | 4TH SURFACE | 5TH SURFACE | 6TH SURFACE |
| KA | -4.0909458 | -0.5113902 | 64.7126663 | -7.0735018 |
| $B_3$ | -0.00703 | 0.047926 | 0.044985 | -0.07874 |
| $B_4$ | -0.00432 | -0.00824 | -0.16894 | -0.02957 |
| $B_5$ | -0.001287 | -0.006227 | 0.1825836 | 0.0088086 |
| $B_6$ | 0.00038 | 0.002141 | -0.0529 | 0.01447 |
| $B_7$ | 9.03E-05 | 3.02E-05 | 0.026979 | -0.0001 |
| $B_8$ | 2.55E-06 | -2.3E-05 | -0.03737 | -0.00248 |
| $B_9$ | 1.2E-06 | -1.2E-05 | -0.04329 | -0.00051 |
| $B_{10}$ | -3.9E-06 | 6.6E-07 | 0.047066 | 0.000877 |

FIG. 27 (B)

| DATA RELATING TO PARAMETERS IN CONFITION FORMULAE OF EXAMPLE 7 | | | |
|---|---|---|---|
| f | 1.55 | $f_1$ | -6.19 |
| 2ω | 167° | L/BF OF CONDITION FORMULA (1) | 4.46 |
| L (IN AIR) | 12.93 | $|f_1/f|$ OF CONDITION FORMULA (2) | 4.00 |
| BF (IN AIR) | 2.90 | L/2ωx OF CONDITION FORMUAL (3) | 1.97 |

FIG. 28

| | BASIC LENS DATE OF EXAMPLE 8 | | | | |
|---|---|---|---|---|---|
| | Si<br>SURFACE<br>NO. | Ri<br>RADIUS OF<br>CURVATURE | Di<br>SURFACE<br>INTERVAL | Ndj<br>REFRACTIVE<br>INDEX | vdj<br>ABBE<br>NUMBER |
| L1 | 1 | 27.58 | 1.41 | 1.77250 | 49.6 |
| | 2 | 3.58 | 2.21 | | |
| L2 | 3 | -2.47 | 1.46 | 1.50869 | 56.0 |
| | 4 | -3.36 | 2.06 | | |
| L3 | 5 | -268.40 | 2.12 | 1.50869 | 56.0 |
| | 6 | -1.45 | | | |

FIG. 29 (A)

| ASPHERICAL SURFACE DATA AND DIFFRACTING SURFACE DATA OF EXAMPLE 8 | | | | |
|---|---|---|---|---|
| ASPHERICAL COEFFICIENT | SURFACE NO. | | | |
| | 3RD SURFACE | 4TH SURFACE | 5TH SURFACE | 6TH SURFACE |
| KA | -10.7876966 | -1.2247138 | 137374.696 | -1.1474303 |
| $B_3$ | 0.016385 | 0.086763 | -0.00461 | -0.04022 |
| $B_4$ | 0.005459 | -0.00576 | -0.06856 | -0.00111 |
| $B_5$ | -0.000998 | -0.005065 | 0.0425656 | -0.039195 |
| $B_6$ | -7.7E-06 | 0.001793 | -0.03586 | 0.011796 |
| $B_7$ | -4.7E-05 | -0.00043 | -0.00963 | 0.008401 |
| $B_8$ | 5.91E-06 | -0.00022 | 0.076564 | -0.00058 |
| $B_9$ | 5.58E-06 | -3E-05 | 0.040642 | -0.00344 |
| $B_{10}$ | -2.4E-06 | 3.61E-05 | -0.25475 | -0.00036 |

FIG. 29 (B)

| DATA RELATING TO PARAMETERS IN CONFITION FORMULAE OF EXAMPLE 8 | | | |
|---|---|---|---|
| f | 1.45 | $f_1$ | -5.46 |
| 2ω | 169° | L/BF OF CONDITION FORMULA (1) | 3.54 |
| L (IN AIR) | 12.91 | $|f_1/f|$ OF CONDITION FORMULA (2) | 3.77 |
| BF (IN AIR) | 3.65 | L/2ωx OF CONDITION FORMUAL (3) | 1.95 |

FIG. 30

| | Si<br>SURFACE<br>NO. | Ri<br>RADIUS OF<br>CURVATURE | Di<br>SURFACE<br>INTERVAL | Ndj<br>REFRACTIVE<br>INDEX | vdj<br>ABBE<br>NUMBER |
|---|---|---|---|---|---|
| | \multicolumn{5}{c}{BASIC LENS DATE OF EXAMPLE 9} | | | | |
| L1 | 1 | 28.47 | 1.37 | 1.77250 | 49.6 |
| | 2 | 4.54 | 2.40 | | |
| L2 | 3 | -1.93 | 1.50 | 1.50869 | 56.0 |
| | 4 | -2.97 | 2.19 | | |
| L3 | 5 | 11.09 | 2.09 | 1.50869 | 56.0 |
| | 6 | -1.57 | | | |

FIG. 31 (A)

| ASPHERICAL SURFACE DATA AND DIFFRACTING SURFACE DATA OF EXAMPLE 9 | | | | |
|---|---|---|---|---|
| ASPHERICAL COEFFICIENT | SURFACE NO. | | | |
| | 3RD SURFACE | 4TH SURFACE | 5TH SURFACE | 6TH SURFACE |
| KA | -4.3955424 | 1.2426197 | 1.998639 | -3.258563 |
| $B_3$ | 0.026998 | 0.079876 | -0.04374 | -0.06195 |
| $B_4$ | 0.002975 | 0.011345 | 0.089927 | -0.02416 |
| $B_5$ | -0.002078 | 0.0011094 | -0.044373 | -0.013782 |
| $B_6$ | 0.000201 | -0.00171 | -0.29343 | 0.010764 |
| $B_7$ | 4.07E-05 | 0.000272 | -0.09658 | 0.002951 |
| $B_8$ | 6.08E-06 | 0.000144 | 0.733087 | 0.000104 |
| $B_9$ | -6.7E-07 | 2.72E-05 | 1.238607 | 6.04E-05 |
| $B_{10}$ | -7.3E-07 | -2.2E-05 | -2.24215 | -0.00155 |

FIG. 31 (B)

| DATA RELATING TO PARAMETERS IN CONFITION FORMULAE OF EXAMPLE 9 | | | |
|---|---|---|---|
| f | 1.49 | $f_1$ | -7.18 |
| 2ω | 167° | L/BF OF CONDITION FORMULA (1) | 3.79 |
| L (IN AIR) | 12.96 | $|f_1/f|$ OF CONDITION FORMULA (2) | 4.82 |
| BF (IN AIR) | 3.42 | L/2ωx OF CONDITION FORMUAL (3) | 1.98 |

FIG. 32

| | BASIC LENS DATE OF EXAMPLE 10 | | | | |
|---|---|---|---|---|---|
| | Si SURFACE NO. | Ri RADIUS OF CURVATURE | Di SURFACE INTERVAL | Ndj REFRACTIVE INDEX | vdj ABBE NUMBER |
| L1 | 1 | 25.28 | 1.00 | 1.77250 | 49.6 |
| L1 | 2 | 2.46 | 1.13 | | |
| L2 | 3 | -7.12 | 1.82 | 1.50869 | 56.0 |
| L2 | 4 | 30.00 | 0.72 | | |
| L3 | 5 | 2.98 | 2.13 | 1.50869 | 56.0 |
| L3 | 6 | -1.46 | | | |

FIG. 33 (A)

| ASPHERICAL SURFACE DATA AND DIFFRACTING SURFACE DATA OF EXAMPLE 10 | | | | |
|---|---|---|---|---|
| ASPHERICAL COEFFICIENT | SURFACE NO. | | | |
| | 3RD SURFACE | 4TH SURFACE | 5TH SURFACE | 6TH SURFACE |
| KA | -67.8497345 | -5.70553E+11 | -53.3162768 | -17.4395111 |
| $B_3$ | -0.00084 | 0.16229 | 0.130616 | -0.29062 |
| $B_4$ | 0.076706 | -0.13586 | -0.16634 | 0.129359 |
| $B_5$ | -0.043146 | 0.1493222 | 0.3303173 | -0.037845 |
| $B_6$ | 0.010241 | -0.05667 | -0.21198 | 0.034622 |

FIG. 33 (B)

| DATA RELATING TO PARAMETERS IN CONFITION FORMULAE OF EXAMPLE 10 | | | |
|---|---|---|---|
| f | 1.46 | $f_1$ | -3.60 |
| 2ω | 162° | L/BF OF CONDITION FORMULA (1) | 3.39 |
| L (IN AIR) | 9.64 | $|f_1/f|$ OF CONDITION FORMULA (2) | 2.46 |
| BF (IN AIR) | 2.84 | L/2ωx OF CONDITION FORMUAL (3) | 1.52 |

FIG. 34

| | BASIC LENS DATE OF EXAMPLE 11 | | | | |
|---|---|---|---|---|---|
| | Si SURFACE NO. | Ri RADIUS OF CURVATURE | Di SURFACE INTERVAL | Ndj REFRACTIVE INDEX | vdj ABBE NUMBER |
| L1 | 1 | 18.96 | 1.00 | 1.51680 | 64.2 |
| | 2 | 4.79 | 1.86 | | |
| L2 | 3 | -1.74 | 1.99 | 1.50869 | 56.0 |
| | 4 | 10.00 | 1.09 | | |
| L3 | 5 | 2.04 | 2.25 | 1.50869 | 56.0 |
| | 6 | -1.44 | | | |

FIG. 35 (A)

| ASPHERICAL SURFACE DATA AND DIFFRACTING SURFACE DATA OF EXAMPLE 11 | | | | |
|---|---|---|---|---|
| ASPHERICAL COEFFICIENT | SURFACE NO. | | | |
| | 3RD SURFACE | 4TH SURFACE | 5TH SURFACE | 6TH SURFACE |
| KA | -6.1649063 | -1.58236E+12 | 3.2159382 | -10.9602226 |
| $B_3$ | 0.063071 | 0.231853 | -0.01803 | -0.28701 |
| $B_4$ | -0.01876 | -0.13941 | -0.10201 | 0.094804 |
| $B_5$ | 0.0035826 | 0.1766314 | 0.1509371 | 0.0640415 |
| $B_6$ | -0.0004 | -0.08661 | -0.12986 | -0.01354 |

FIG. 35 (B)

| DATA RELATING TO PARAMETERS IN CONFITION FORMULAE OF EXAMPLE 11 | | | |
|---|---|---|---|
| f | 1.23 | $f_1$ | -12.71 |
| 2ω | 151° | L/BF OF CONDITION FORMULA (1) | 4.53 |
| L (IN AIR) | 10.52 | $|f_1/f|$ OF CONDITION FORMULA (2) | 10.33 |
| BF (IN AIR) | 2.32 | L/2ωx OF CONDITION FORMUAL (3) | 1.77 |

FIG. 36

| BASIC LENS DATE OF EXAMPLE 12 | | | | |
|---|---|---|---|---|
| Si SURFACE NO. | Ri RADIUS OF CURVATURE | Di SURFACE INTERVAL | Ndj REFRACTIVE INDEX | vdj ABBE NUMBER |
| 1 | 18.96 | 1.00 | 1.51680 | 64.2 |
| 2 | 4.79 | 1.68 | | |
| 3 | -2.10 | 1.97 | 1.58362 | 30.2 |
| 4 | 62.00 | 1.21 | | |
| 5 | 2.70 | 1.69 | 1.50869 | 56.0 |
| 6 | -1.43 | | | |

L1: surfaces 1–2
L2: surfaces 3–4
L3: surfaces 5–6

FIG. 37 (A)

| ASPHERICAL SURFACE DATA AND DIFFRACTING SURFACE DATA OF EXAMPLE 12 | | | | |
|---|---|---|---|---|
| ASPHERICAL COEFFICIENT | SURFACE NO. | | | |
| | 3RD SURFACE | 4TH SURFACE | 5TH SURFACE | 6TH SURFACE |
| KA | -9.1679438 | -1.5374E+12 | 6.2700094 | -14.7687824 |
| $B_3$ | 0.056106 | 0.233319 | -0.00362 | -0.3161 |
| $B_4$ | -0.01752 | -0.09894 | -0.12341 | 0.086952 |
| $B_5$ | 0.0046383 | 0.0663254 | 0.1534236 | 0.0540155 |
| $B_6$ | -0.00051 | 0.026173 | -0.1089 | -0.0091 |

FIG. 37 (B)

| DATA RELATING TO PARAMETERS IN CONFITION FORMULAE OF EXAMPLE 12 | | | |
|---|---|---|---|
| f | 1.35 | $f_1$ | -12.71 |
| 2ω | 153° | L/BF OF CONDITION FORMULA (1) | 3.79 |
| L (IN AIR) | 10.24 | $|f_1/f|$ OF CONDITION FORMULA (2) | 9.41 |
| BF (IN AIR) | 2.70 | L/2ωx OF CONDITION FORMUAL (3) | 1.71 |

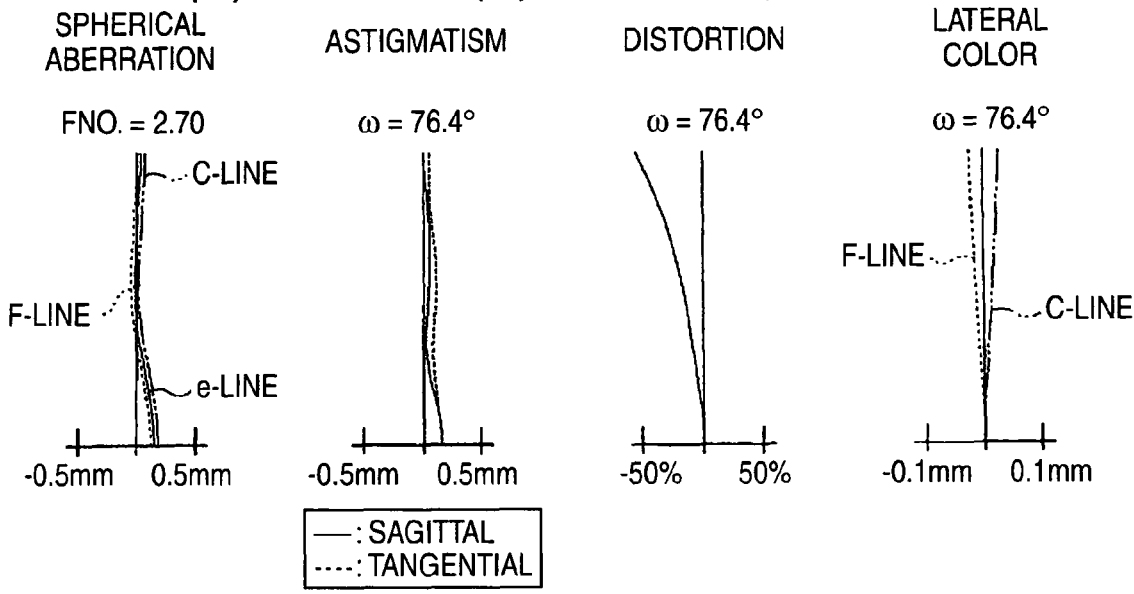
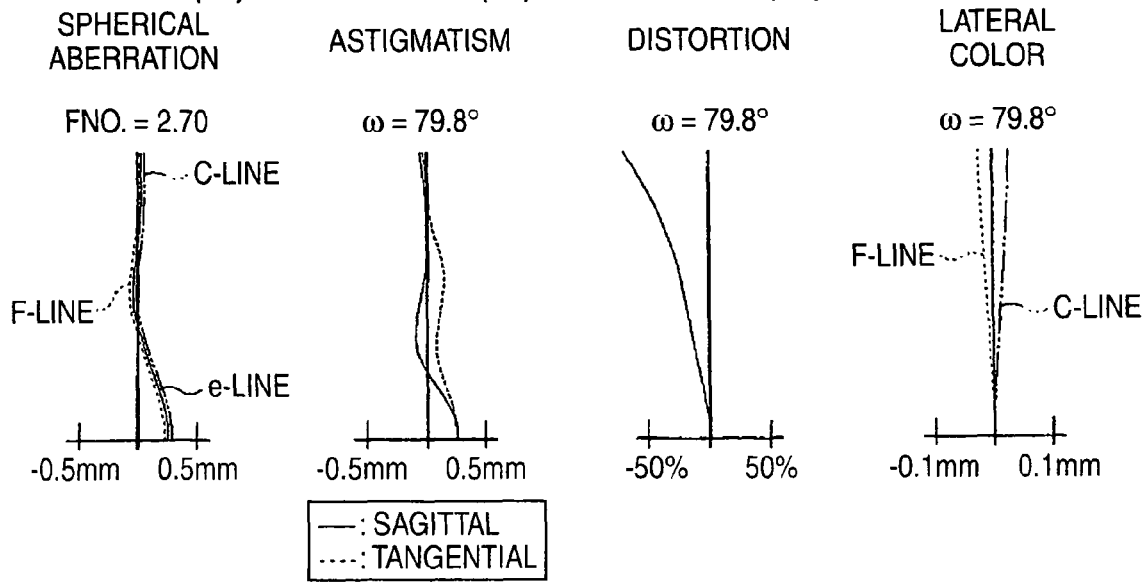

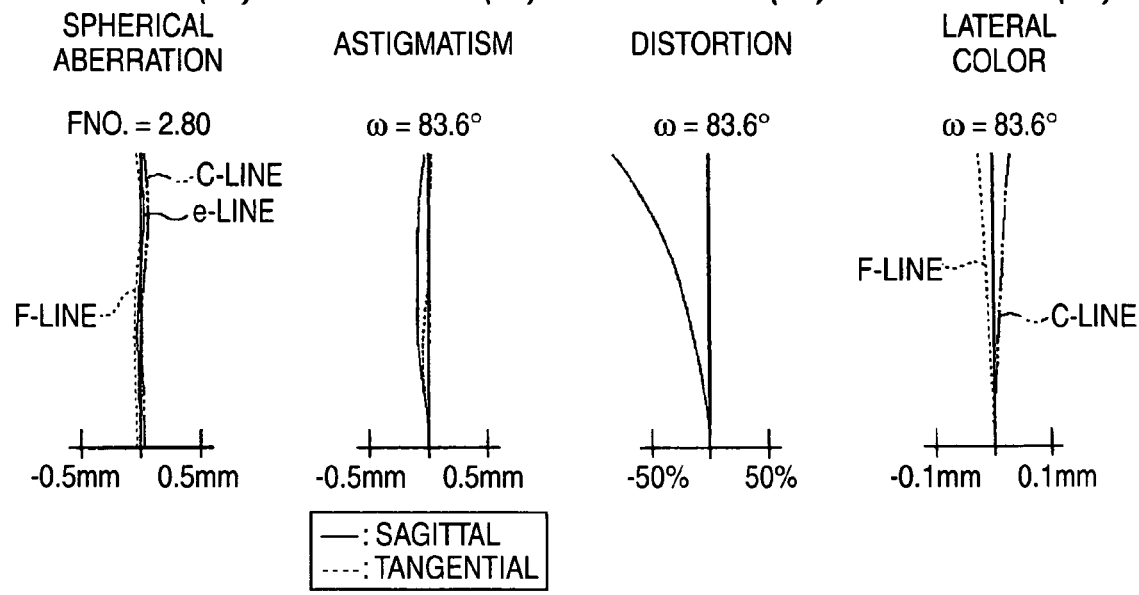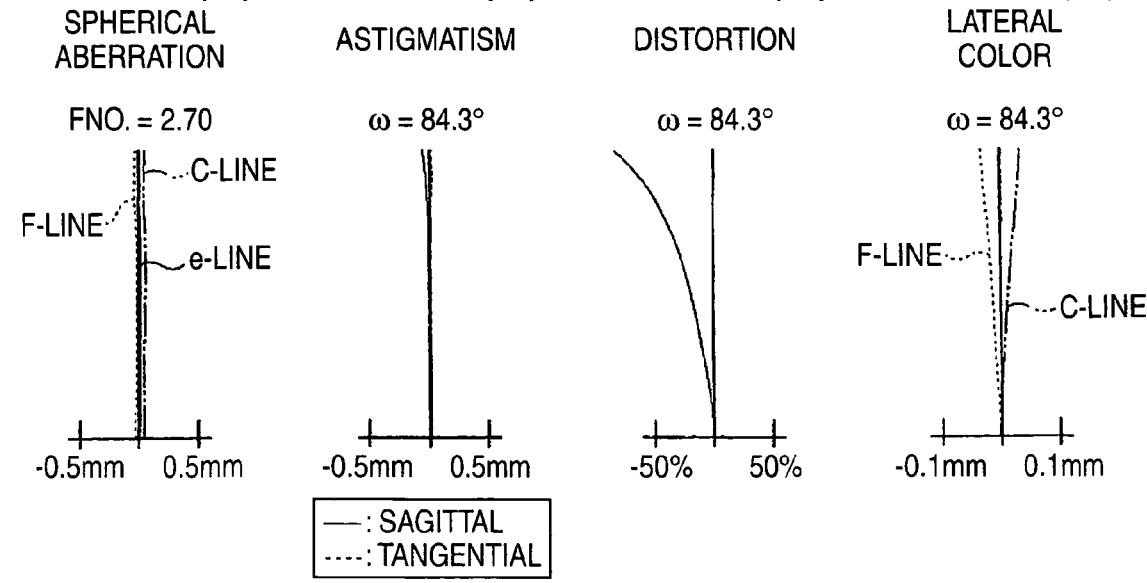

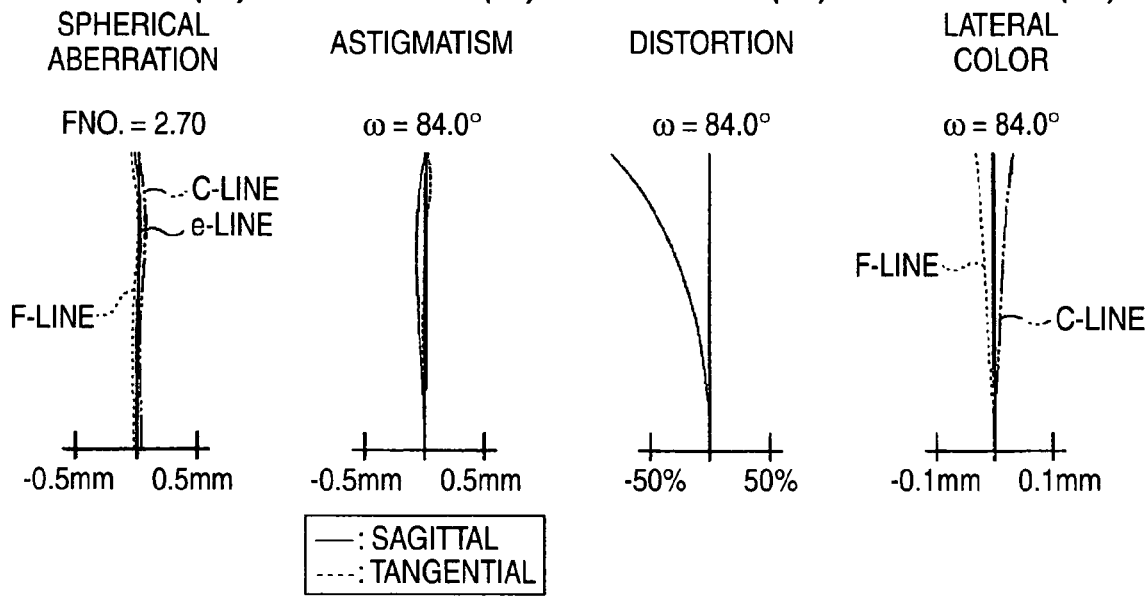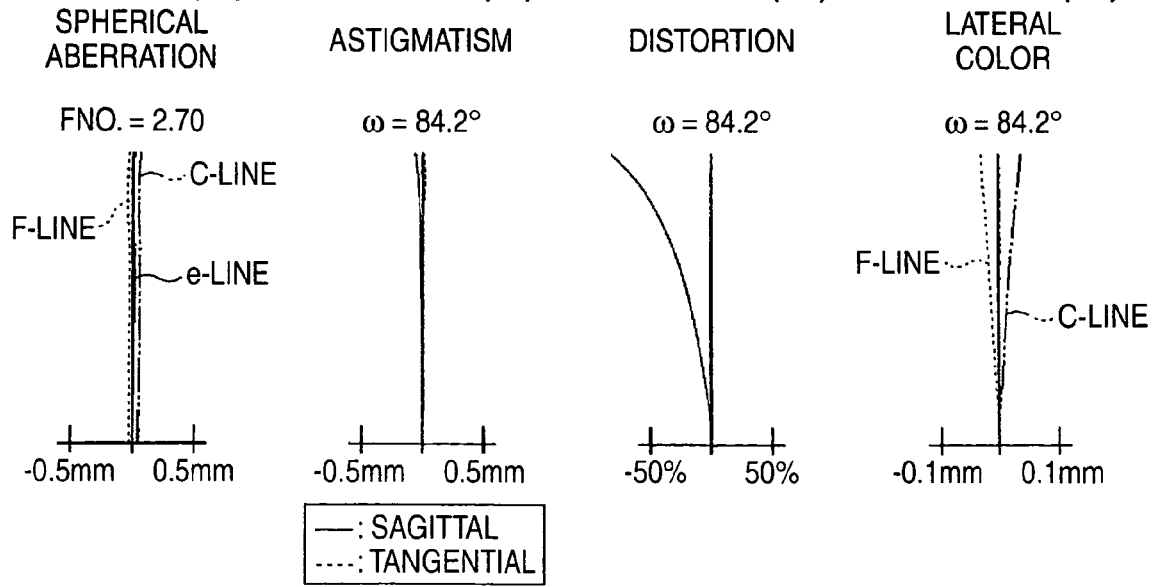

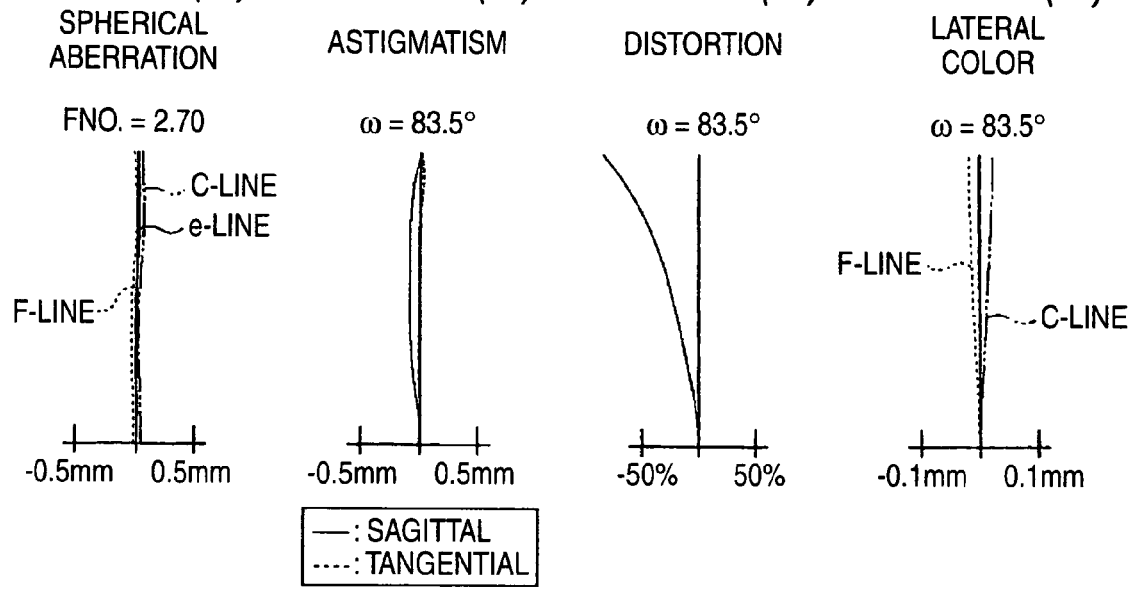
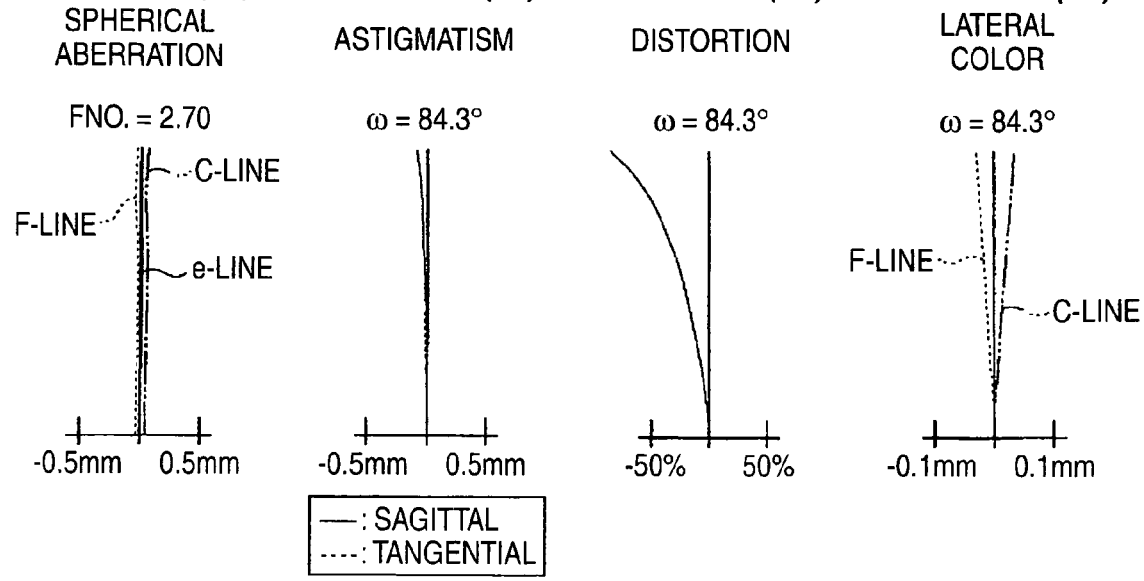

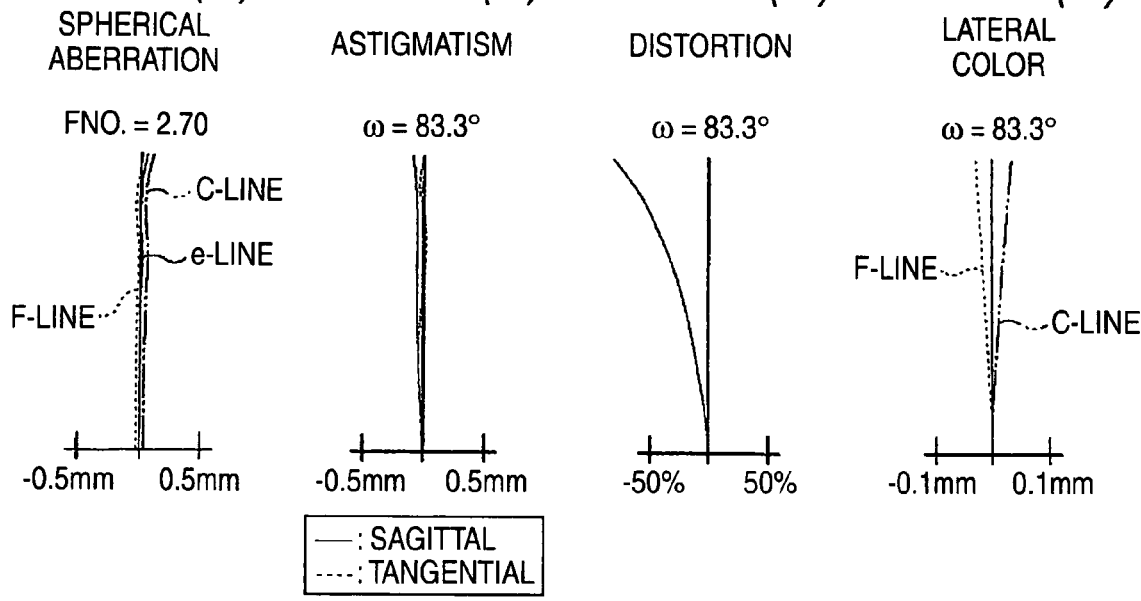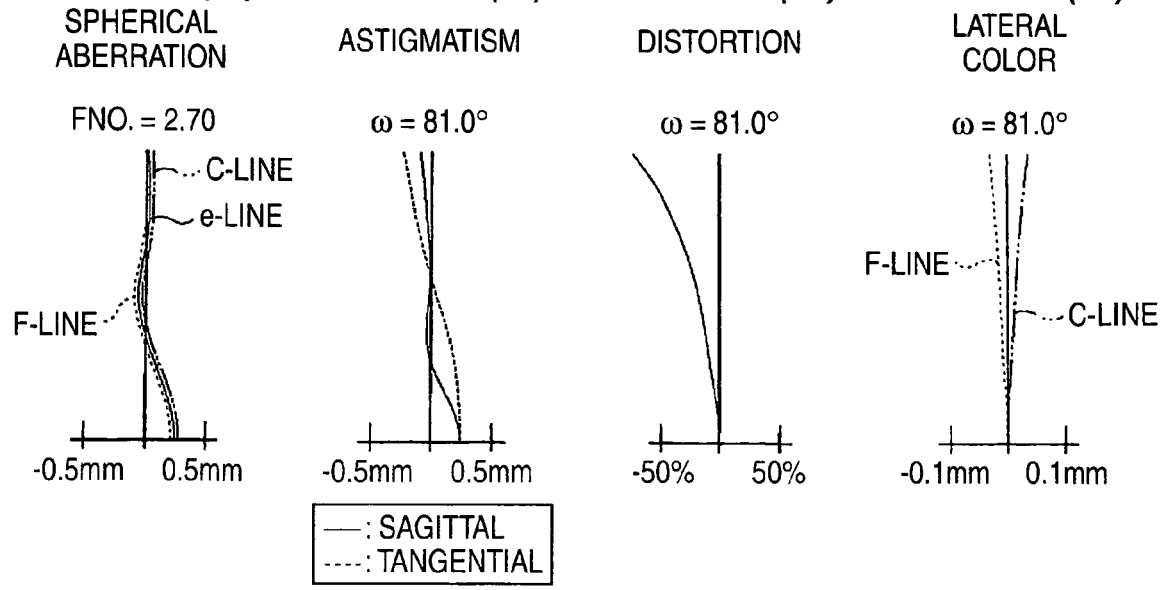

FIG. 48 (A)
SPHERICAL ABERRATION
FIG. 48 (B)
ASTIGMATISM
FIG. 48 (C)
DISTORTION
FIG. 48 (D)
LATERAL COLOR
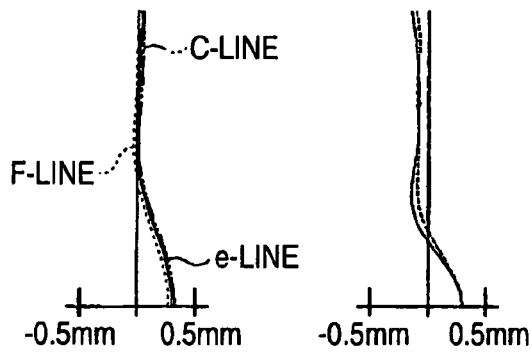
FIG. 49 (A)
SPHERICAL ABERRATION
FIG. 49 (B)
ASTIGMATISM
FIG. 49 (C)
DISTORTION
FIG. 49 (D)
LATERAL COLOR
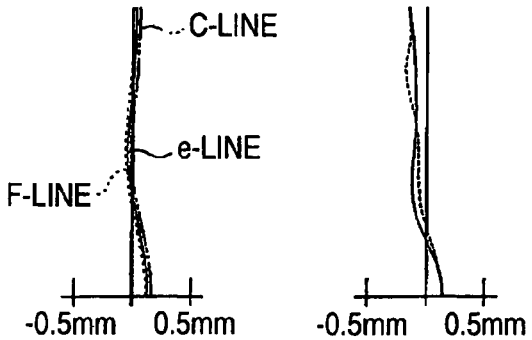

WIDE-ANGLE IMAGING LENS

BACKGROUND OF THE INVENTION

1. Field of the Invention

The present invention relates to an imaging lens that is used in a vehicular camera, a cell phone camera, a surveillance camera, or the like having an imaging device such as a CCD (charge-coupled device) sensor or a CMOS (complementary metal oxide semiconductor) sensor. And the invention mainly relates to, for example, a wide-angle imaging lens that is used in a vehicular camera for taking an image of a front sight, a side sight, a rear sight, or the like as viewed from a vehicle.

2. Description of Related Art

In recent years, imaging devices such as CCD sensors and CMOS sensors have been increased greatly in miniaturization and the number of pixels. Accordingly, imaging apparatus main bodies and lenses mounted thereon are required to be reduced in size and weight. On the other hand, a wide-angle lens having a large angle of view (e.g., 140° or more diagonally) is required in vehicular cameras etc.

Among wide-angle imaging lenses having a relatively small number of lenses are ones disclosed in JP-A-7-72382JP-A-2001-337268 and JP-A-2002-244031. JP-A-7-72382 discloses a wide-angle lens for a CCD camera which has a three-lens configuration. JP-A-2001-337268 discloses a wide-angle lens including three aspherical lenses. JP-A-2002-244031 discloses a wide-angle lens including a total of four lenses which are divided into a first group and a second group.

However, the wide-angle lens of JP-A-7-72382 is not sufficient in miniaturization and angle-of-view increase. The wide-angle lens of JP-A-2001-337268 employs a plastic aspherical lens as the first lens. However, in such cameras as vehicular cameras which may be used in an environment in which high weather resistance is required, it is preferable that the first lens be made of glass. In the wide-angle lens of JP-A-2001-337268since the first lens is an aspherical lens, forming the first lens with glass is costly. The wide-angle lens of JP-A-2002-244031which consists of four lenses, is disadvantageous in cost and weight reduction though it is advantageous in performance.

SUMMARY OF THE INVENTION

An object of an illustrative, non-limiting embodiment of the invention is to provide a wide-angle imaging lens, which can be realized at a low cost as a compact, lightweight wide-angle lens system which exhibits good optical performance.

A wide-angle imaging lens according to one aspect of the invention includes: in order from an object side of the wide-angle imaging lens, a first lens of a negative meniscus lens having a convex surface on the object side thereof; a second lens, at least one surface of which is an aspherical surface; and a positive third lens having a convex surface on an image side thereof, at least one surface of the third lens being an aspherical surface. The first lens is made of a material having an Abbe number of 40 or more and the third lens is made of a material having an Abbe number of 50 or more. An aperture stop is disposed between the second lens and the third lens.

The wide-angle imaging lens can be realized at a low cost as a compact, lightweight wide-angle lens system which exhibits good optical performance because the aspherical surface shapes, the lens materials, etc. are optimized by using a small number of (i.e., three) lenses.

More desirable performance can be attained by satisfying required specifications by employing an appropriate one or ones of the following features.

In one aspect of the invention, it is preferable that both surfaces of each of the second lens and the third lens be aspherical surfaces. It is preferable that the diagonal angle of view that be greater than or equal to 140°

In one aspect of the invention, it is preferable that each of the second lens and the third lens be made of plastics. It is preferable that each of the second lens and the third lens be made of a material whose coefficient of water absorption is 0.3% or less. Furthermore, it is preferable that the third lens be made of a polyolefin-type material.

It is preferable that the object-side surface of the second lens be shaped in such a manner as to be a concave surface on an optical axis of the second lens and to decrease in negative power of the object-side surface as a position on the object-side surface goes away from the optical axis.

In this case, the object-side surface of the second lens may be shaped in such a manner as to change from the concave surface to a convex surface in a peripheral portion of the object-side surface as the position goes away from the optical axis.

It is preferable that the image-side surface of the second lens be shaped in such a manner as to be a concave surface on the optical axis and to increase in negative power of the image-side surface as a position on the image-side surface goes away from the optical axis.

Alternatively, it is preferable that the image-side surface of the second lens be shaped in such a manner as to be a convex surface on the optical axis and to decrease in positive power of the image-side surface as the position goes away from the optical axis. In this case, the image-side surface of the second lens may be shaped in such a manner as to change from the convex surface to a concave surface in a peripheral portion of the image-side surface as the position goes away from the optical axis.

It is preferable to satisfy:

$$3<L/BF<7 \tag{1}$$

where L is the distance between the top of the object-side surface of the first lens and the imaging device surface, and BF is the distance between the top of the image-side surface of the third lens and the imaging device surface.

It is preferable to satisfy:

$$2<|f1/f|<11 \tag{2}$$

where f is the focal length of the wide-angle imaging lens, and f1 is the focal length of the first lens.

Furthermore, it is preferable to satisfy:

$$L/(2\omega x)<2.3 \tag{3}$$

where L is the distance between the top of the object-side surface of the first lens and the imaging device surface, x is the maximum image height, and 2ω is the diagonal angle of view in radian.

BRIEF DESCRIPTION OF THE DRAWINGS

The features of the invention will appear more fully upon consideration of the exemplary embodiment of the invention, which are schematically set forth in the drawings, in which:

FIG. 14 shows basic lens data of the wide-angle imaging lens of Example 1 of the invention;

FIG. 15 shows data relating to aspherical surfaces of the wide-angle imaging lens of Example 1 of the invention and its data relating to parameters included in condition formulae;

FIG. 16 shows basic lens data of the wide-angle imaging lens of Example 2 of the invention;

FIG. 17 shows data relating to aspherical surfaces of the wide-angle imaging lens of Example 2 of the invention and its data relating to the parameters included in the condition formulae;

FIG. 18 shows basic lens data of the wide-angle imaging lens of Example 3 of the invention;

FIG. 19 shows data relating to aspherical surfaces of the wide-angle imaging lens of Example 3 of the invention and its data relating to the parameters included in the condition formulae;

FIG. 20 shows basic lens data of the wide-angle imaging lens of Example 4 of the invention;

FIG. 21 shows data relating to aspherical surfaces of the wide-angle imaging lens of Example 4 of the invention and its data relating to the parameters included in the condition formulae;

FIG. 22 shows basic lens data of the wide-angle imaging lens of Example 5 of the invention;

FIG. 23 shows data relating to aspherical surfaces of the wide-angle imaging lens of Example 5 of the invention and its data relating to the parameters included in the condition formulae;

FIG. 24 shows basic lens data of the wide-angle imaging lens of Example 6 of the invention;

FIG. 25 shows data relating to aspherical surfaces of the wide-angle imaging lens of Example 6 of the invention and its data relating to the parameters included in the condition formulae;

FIG. 26 shows basic lens data of the wide-angle imaging lens of Example 7 of the invention;

FIG. 27 shows data relating to aspherical surfaces of the wide-angle imaging lens of Example 7 of the invention and its data relating to the parameters included in the condition formulae;

FIG. 28 shows basic lens data of the wide-angle imaging lens of Example 8 of the invention;

FIG. 29 shows data relating to aspherical surfaces of the wide-angle imaging lens of Example 8 of the invention and its data relating to the parameters included in the condition formulae;

FIG. 30 shows basic lens data of the wide-angle imaging lens of Example 9 of the invention;

FIG. 31 shows data relating to aspherical surfaces of the wide-angle imaging lens of Example 9 of the invention and its data relating to the parameters included in the condition formulae;

FIG. 32 shows basic lens data of the wide-angle imaging lens of Example 10 of the invention;

FIG. 33 shows data relating to aspherical surfaces of the wide-angle imaging lens of Example 10 of the invention and its data relating to the parameters included in the condition formulae;

FIG. 34 shows basic lens data of the wide-angle imaging lens of Example 11 of the invention;

FIG. 35 shows data relating to aspherical surfaces of the wide-angle imaging lens of Example 11 of the invention and its data relating to the parameters included in the condition formulae;

FIG. 36 shows basic lens data of the wide-angle imaging lens of Example 12 of the invention;

FIG. 37 shows data relating to aspherical surfaces of the wide-angle imaging lens of Example 12 of the invention and its data relating to the parameters included in the condition formulae;

FIG. 38 is aberration diagrams showing various aberrations of the wide-angle imaging lens of Example 1 of the invention, and (A)-(D) show the spherical aberration, astigmatism, distortion, and lateral color, respectively;

FIG. 39 is aberration diagrams showing various aberrations of the wide-angle imaging lens of Example 2 of the invention, and (A)-(D) show the spherical aberration, astigmatism, distortion, and lateral color, respectively;

FIG. 40 is aberration diagrams showing various aberrations of the wide-angle imaging lens of Example 3 of the invention, and (A)-(D) show the spherical aberration, astigmatism, distortion, and lateral color, respectively;

FIG. 41 is aberration diagrams showing various aberrations of the wide-angle imaging lens of Example 4 of the invention, and (A)-(D) show the spherical aberration, astigmatism, distortion, and lateral color, respectively;

FIG. 42 is aberration diagrams showing various aberrations of the wide-angle imaging lens of Example 5 of the invention, and (A)-(D) show the spherical aberration, astigmatism, distortion, and lateral color, respectively;

FIG. 43 is aberration diagrams showing various aberrations of the wide-angle imaging lens of Example 6 of the invention, and (A)-(D) show the spherical aberration, astigmatism, distortion, and lateral color, respectively;

FIG. 44 is aberration diagrams showing various aberrations of the wide-angle imaging lens of Example 7 of the invention, and (A)-(D) show the spherical aberration, astigmatism, distortion, and lateral color, respectively;

FIG. 45 is aberration diagrams showing various aberrations of the wide-angle imaging lens of Example 8 of the invention, and (A)-(D) show the spherical aberration, astigmatism, distortion, and lateral color, respectively;

FIG. 46 is aberration diagrams showing various aberrations of the wide-angle imaging lens of Example 9 of the invention, and (A)-(D) show the spherical aberration, astigmatism, distortion, and lateral color, respectively;

FIG. 47 is aberration diagrams showing various aberrations of the wide-angle imaging lens of Example 10 of the invention, and (A)-(D) show the spherical aberration, astigmatism, distortion, and lateral color, respectively;

FIG. 48 is aberration diagrams showing various aberrations of the wide-angle imaging lens of Example 11 of the invention, and (A)-(D) show the spherical aberration, astigmatism, distortion, and lateral color, respectively; and FIG. 49 is aberration diagrams showing various aberrations of the wide-angle imaging lens of Example 12 of the invention, and (A)-(D) show the spherical aberration, astigmatism, distortion, and lateral color, respectively.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, a wide-angle imaging lens includes: in order from the object side, a first lens of a negative meniscus lens having a convex surface on the object side; a second lens, at least one surface of which is an aspherical surface; and a positive third lens having a convex surface on the image-side, at least one surface of the third lens being an aspherical surface. And the aspherical surface shapes, the lens materials, etc. are optimized by using a small number of (i.e., three) lenses. As a result, as a compact, lightweight wide-angle lens system which exhibits good optical performance is realized at a low cost.

Exemplary embodiments of the present invention will be hereinafter described in detail with reference to the drawings.

Figure 1:
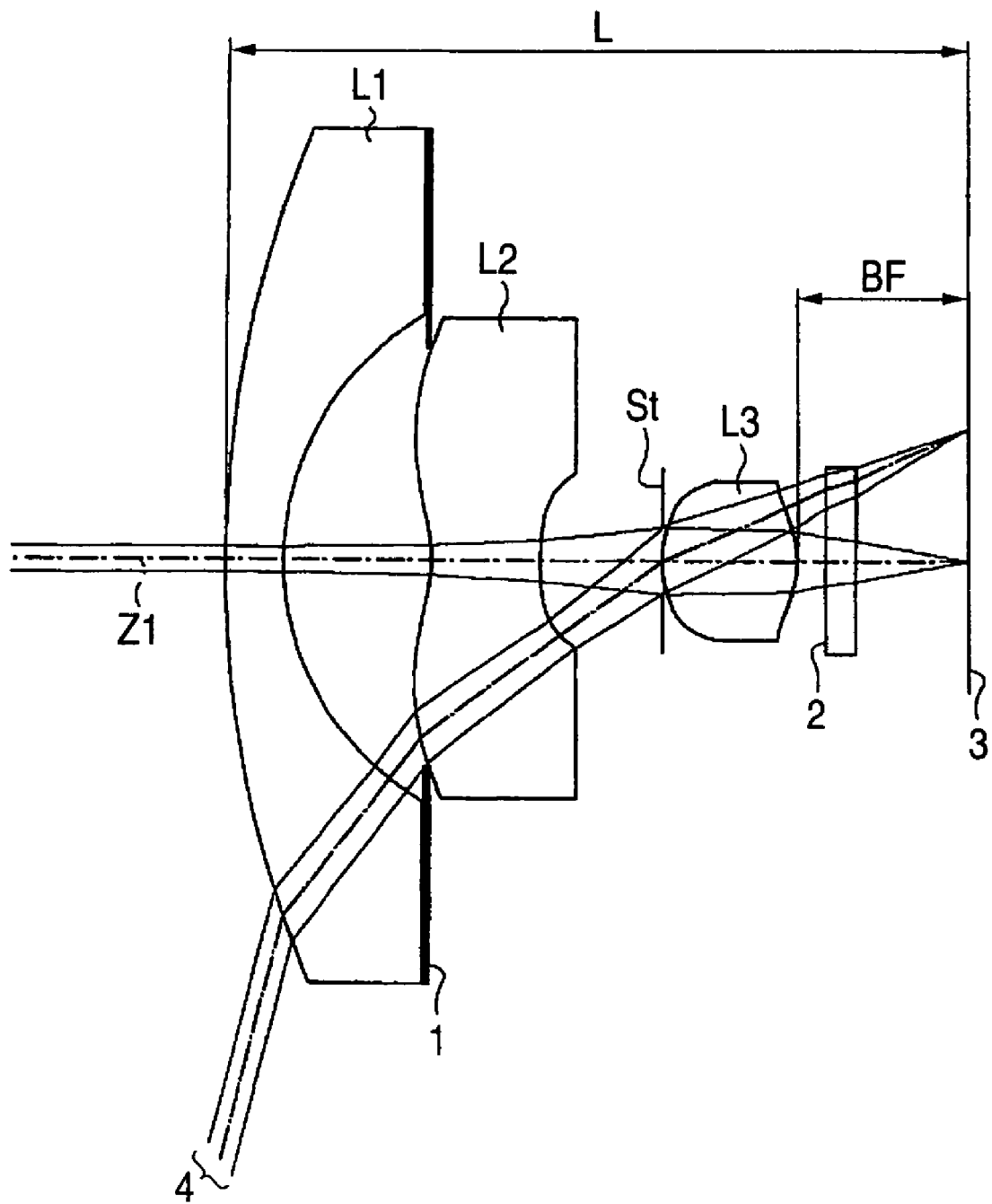
FIG. 1 is a sectional view of an optical system showing a wide-angle imaging lens according to an exemplary embodiment of the invention.

FIG. 1 shows an exemplary configuration of a wide-angle imaging lens according to an exemplary embodiment of the invention. This exemplary configuration corresponds to the lens configuration of a first numerical value Example (described later).

This wide-angle imaging lens is suitable for use in various cameras using an imaging device such as a CCD sensor or a CMOS sensor, for example, vehicular cameras for taking an image of a front sight, a side sight, a rear sight, or the like as viewed from a vehicle. This wide-angle imaging lens is equipped with a first lens L1, a second lens L2, and a third lens L3 which are arranged in this order from the object side along the optical axis Z1. An aperture stop St is disposed on the optical axis Z1 between the second lens L2 and the third lens L3. For example, the diagonal angle of view is as wide as 140° or more.

An imaging device 3 such as a CCD sensor is disposed in the image-forming plane of this wide-angle imaging lens. Various optical members 2 may be disposed between the third lens L3 and the imaging device 3 in accordance with the configuration of a camera to which the lens is attached. For example, a plate-like optical member such as a cover glass for imaging surface protection or an infrared-blocking filter may be disposed there.

In this wide-angle imaging lens, a light beam that enters the lens system through outside the effective diameter range that is set between the first lens L1 and the second lens L2 may reach the image surface as stray light and produce a ghost. In FIG. 1, a light beam 4 is a light beam that enters the lens system at the maximum angle of the angle-of-view range. Light beams traveling outside the light beam 4 may become stray light. To avoid this phenomenon, it is preferable to interrupt stray light by disposing a light shield unit 1 between the first lens L1 and the second lens L2. The light shield unit 1 is an opaque plate member, for example. Alternatively, opaque paint may be applied to the portion, outside the effective diameter range, of the second-lens-L2-side surface of the first lens L1.

The first lens L1 is a negative meniscus lens whose object-side surface is a convex surface. It is preferable that the first lens L1 be a spherical lens made of glass. The second lens L2 is a positive or negative lens which has relatively small power and at least one surface of which is an aspherical surface. The third lens L3 is a positive lens whose image-side surface is a convex surface (i.e., projected toward the image side) and at least one surface of which is an aspherical surface. To correct for the chromatic aberration properly, the first lens L1 is made of a material whose Abbe number is 40 or more and the third lens L3 is made of a material whose Abbe number is 50 or more.

It is preferable that both surfaces of each of the second lens L2 and the third lens L3 be aspherical surfaces. It is preferable that the second lens L2 and the third lens L3 be made of plastics. It is preferable that the materials of the second lens L2 and the third lens L3 have coefficients of water absorption (weight %) that are 0.3% or less. More specifically, it is preferable that the third lens L3 be made of a polyolefin-type material. It is preferable that the second lens L2 also be made of a polyolefin-type material.

It is preferable that the object-side surface of the second lens L2 be shaped in such a manner that it is concave (i.e., recessed) on the optical axis Z1 and its negative power decreases as the position goes away from the optical axis Z1. In this case, the object-side surface of the second lens L2 may be shaped in such a manner as to have a curvature inflection point in the effective diameter range and to change from a concave surface (i.e., recessed) to a convex surface (i.e., projected toward the object side) in the peripheral portion as the position goes away from the optical axis Z1.

It is preferable that the image-side surface of the second lens L2 be shaped in such a manner that it is concave (i.e., recessed) near the optical axis Z1 and its negative power increases as the position goes away from the optical axis Z1.

Alternatively, the image-side surface of the second lens L2 may be shaped in such a manner that it is convex (i.e., projected toward the image side) near the optical axis Z1 and its positive power decreases as the position goes away from the optical axis Z1. In this case, the image-side surface of the second lens L2 may be shaped in such a manner as to have a curvature inflection point in the effective diameter range and to change from a convex surface (i.e., projected toward the image side) to a concave surface (i.e., recessed) in the peripheral portion as the position goes away from the optical axis Z1.

It is preferable that this wide-angle imaging lens satisfy:

$$3 < L/BF < 7 \qquad (1)$$

where L is the distance between the top of the object-side surface of the first lens L1 and the surface of the imaging device 3, and BF is the distance between the top of the image-side surface of the third lens L3 and the surface of the imaging device 3 (see FIG. 1). The distances L and BF are such that the thickness of the optical member 2 such as a cover glass is air-converted.

It is preferable that this wide-angle imaging lens satisfy:

$$2 < |f1/f| < 11 \qquad (2)$$

where f is the focal length of the entire lens system, and f1 is the focal length of the first lens L1.

Furthermore, it is preferable that this wide-angle imaging lens satisfy:

$$L/(2\omega x) < 2.3 \tag{3}$$

where L is the distance between the top of the object-side surface of the first lens L1 and the surface of the imaging device 3, x is the maximum image height, and 2ω (radian) is the diagonal angle of view.

Next, workings and advantages of the wide-angle imaging lens having the above configuration will be described.

In this wide-angle imaging lens, the aperture stop St is disposed between the second lens L2 and the third lens L3, whereby the angle of view is increased while sufficient telecentricity of the angle of incidence to the imaging device 3 is secured. Employing aspherical lenses as the second lens L2 and the third lend L3 provides a high resolution with a short total length. Forming the second lens L2 and the third lens L3 with plastic materials makes it possible to form aspherical surfaces with high accuracy and to realize a lightweight lens system at a low cost. In particular, molding the second lens L2 and the third lens L3 in plastic materials that are low in hydrophilicity (coefficient of water absorption: 0.3% or less) makes it possible to suppress degradation in performance due to absorption of water. To minimize the degradation in performance due to absorption of water, it is desirable that the coefficients of water absorption of the second lens L2 and the third lens L3 be set 0.1% or less. More specifically, the degradation in performance due to absorption of water can be suppressed by molding the third lens L3 in a polyolefin-type material. It is even preferable that the second lens L2 be also made of a polyolefin-type material, in which case the degradation in performance due to absorption of water can be suppressed further. Furthermore, employing a spherical glass lens as the first lens L1 makes it possible to provide, at a low cost, a lens system that can be used even in an environment in which high weather resistance is required, such as a use environment of vehicular cameras.

If L/BF is greater than the upper limit of the condition formula (1), although the aberrations can be corrected for properly, the third lens L3 becomes so close to the imaging device 3 that the lens system cannot be set in place easily or the total lens system becomes too large to attain the object of miniaturization. On the other hand, if L/BF is smaller than the lower limit of the condition formula (1), it is difficult to correct for the aberrations properly.

If |fl/f| is greater than the upper limit of the condition formula (2), the power of the first lens L1 becomes too small to attain a sufficient degree of compactness and a sufficiently large angle of view. On the other hand, if |fl/f| is smaller than the lower limit of the condition formula (2), it is difficult to correct for the chromatic aberration and hence to produce good images.

The condition formula (3) means that the lens system is small and its angle of view is large. The parameter L/2ωx becomes smaller as the size of the imaging device 3 increases or the lens system becomes smaller or its angle of view increases. This wide-angle imaging lens satisfies the condition formula (3) and hence is small in size and large in the angle of view for a ¼-inch-size imaging device 3 (diagonal image height: 2.25 mm), for example.

As described above, according to the embodiment, a wide-angle imaging lens can be realized at a low cost as a compact, lightweight wide-angle lens system which exhibits good optical performance because the aspherical surface shapes, the lens materials, etc. are optimized by using a small number of (i.e., three) lenses.

Next, specific numerical value Examples corresponding to the above wide-angle imaging lens according to the embodiment will be described. First to 12th numerical value Examples will be described together below.

Figure 2:
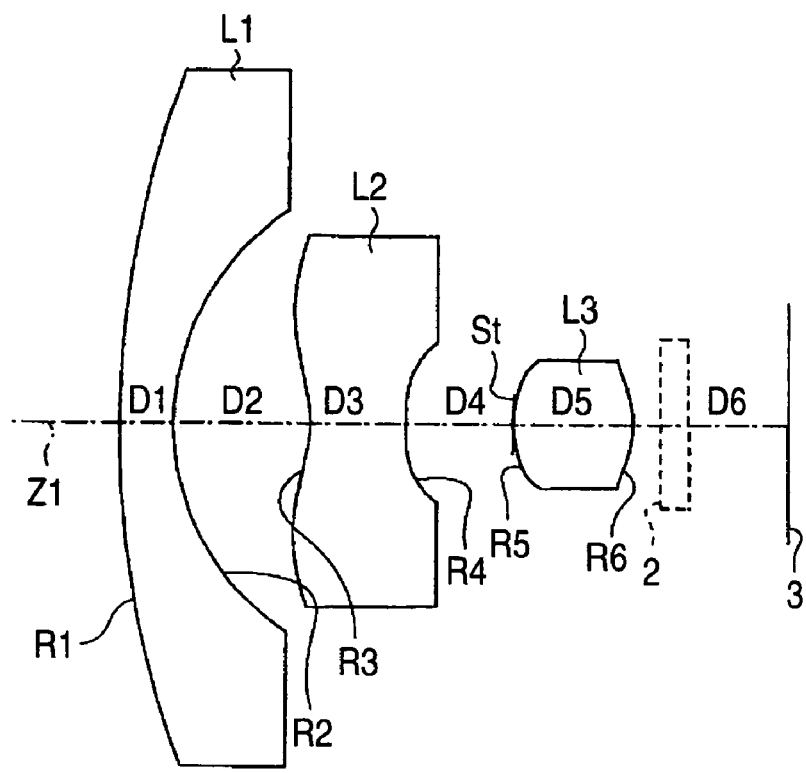
FIG. 2 is a sectional view of a wide-angle imaging lens of Example 1 of the invention.
Figure 3:
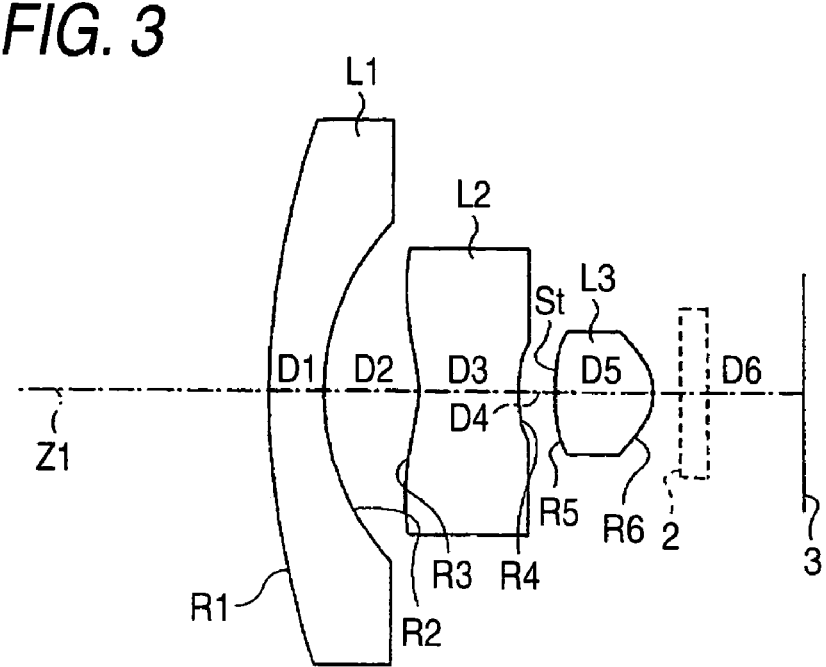
FIG. 3 is a sectional view of a wide-angle imaging lens of Example 2 of the invention.
Figure 4:
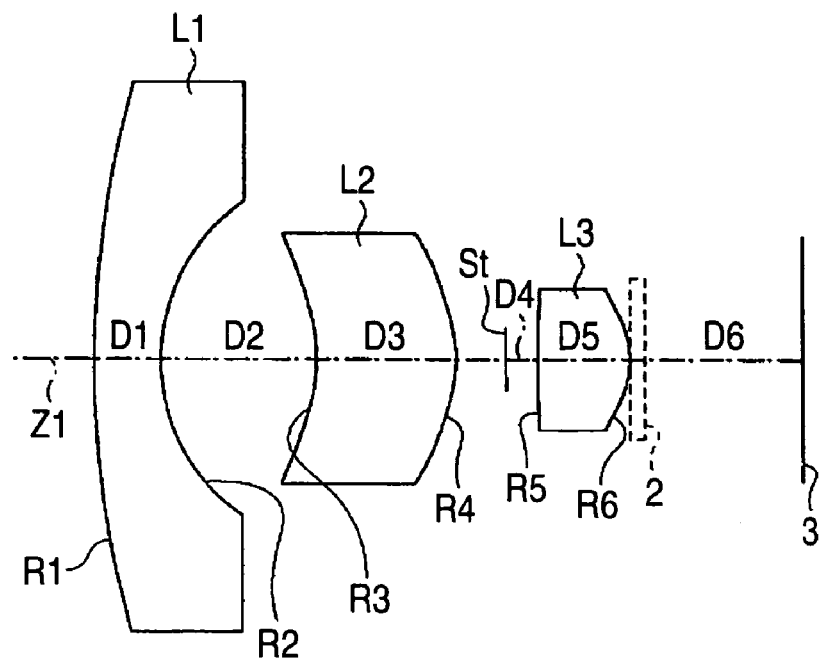
FIG. 4 is a sectional view of a wide-angle imaging lens of Example 3 of the invention.
Figure 5:
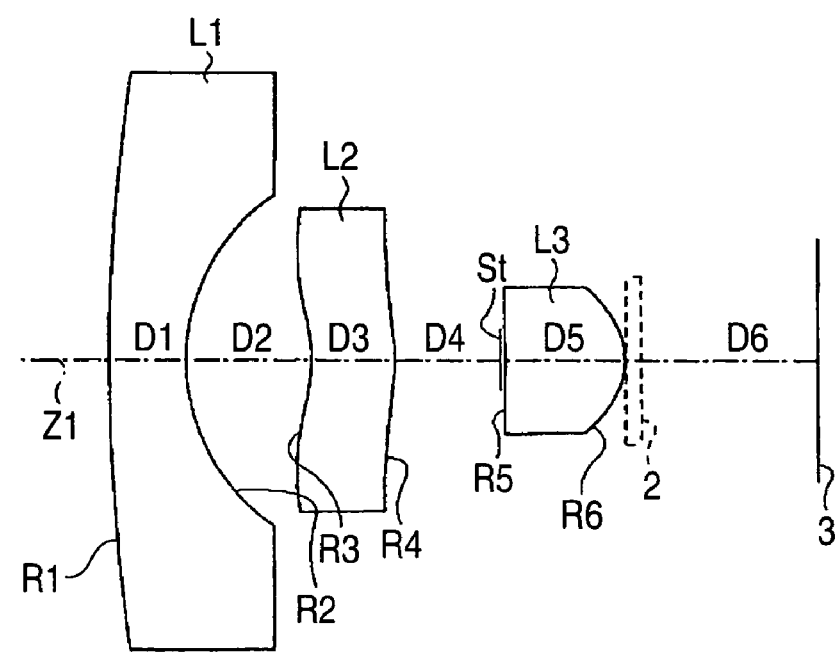
FIG. 5 is a sectional view of a wide-angle imaging lens of Example 4 of the invention.
Figure 6:
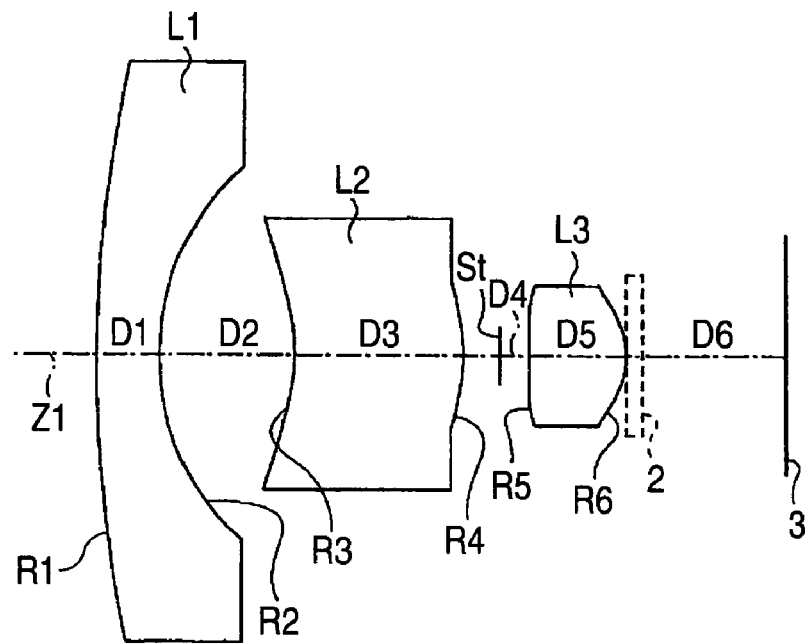
FIG. 6 is a sectional view of a wide-angle imaging lens of Example 5 of the invention.
Figure 7:
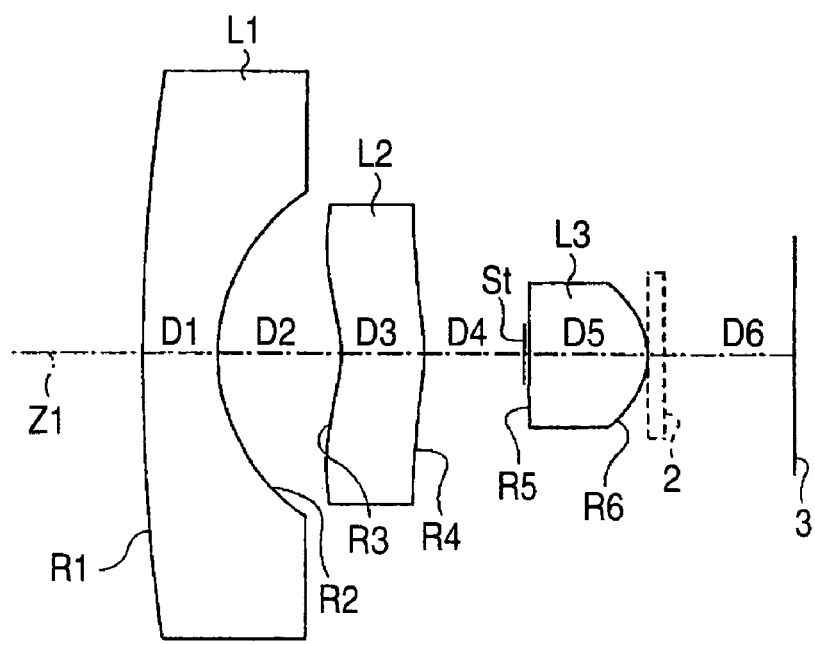
FIG. 7 is a sectional view of a wide-angle imaging lens of Example 6 of the invention.
Figure 8:
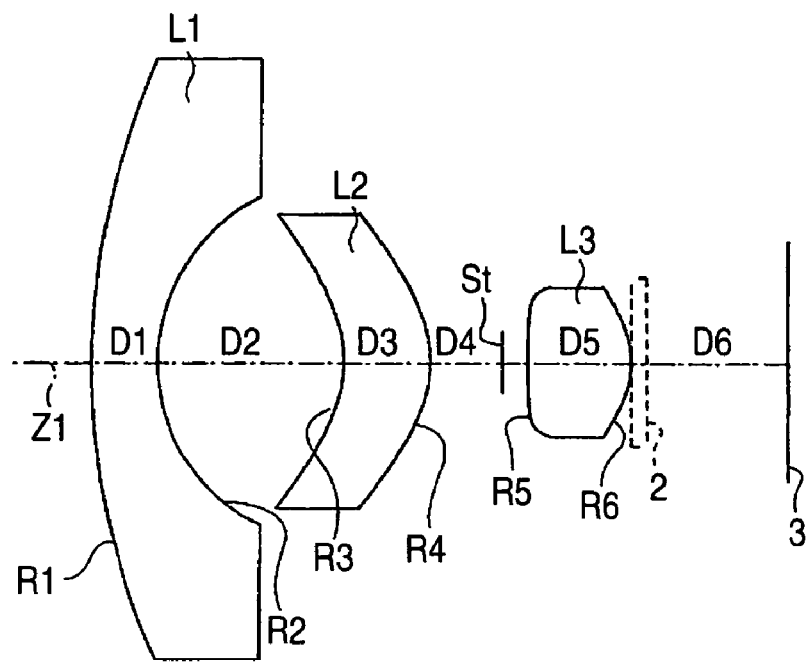
FIG. 8 is a sectional view of a wide-angle imaging lens of Example 7 of the invention.
Figure 9:
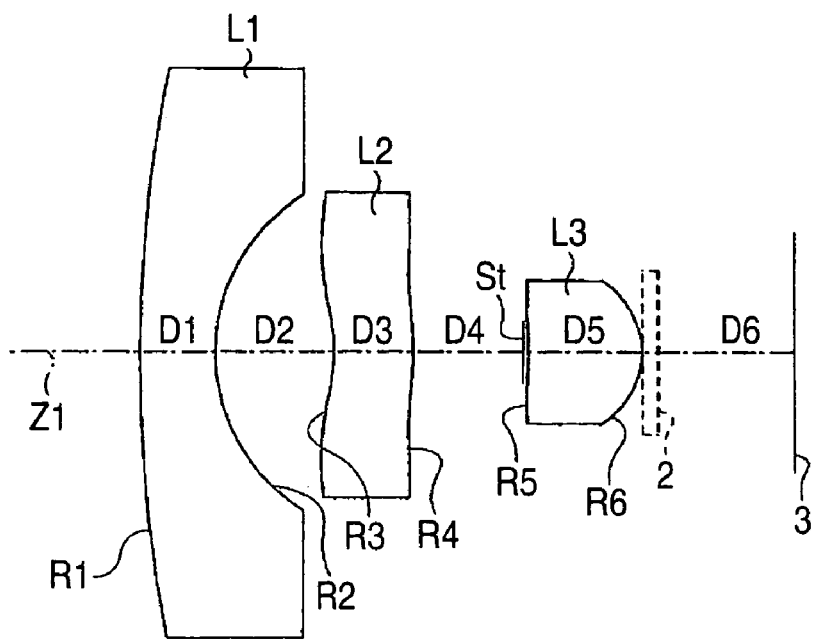
FIG. 9 is a sectional view of a wide-angle imaging lens of Example 8 of the invention.
Figure 10:
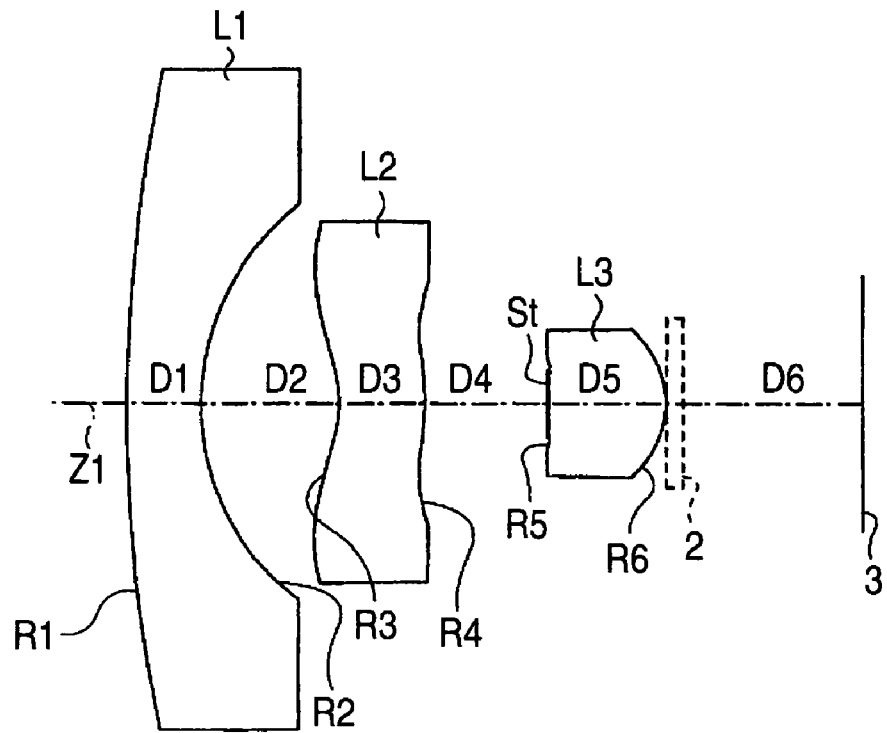
FIG. 10 is a sectional view of a wide-angle imaging lens of Example 9 of the invention.
Figure 11:
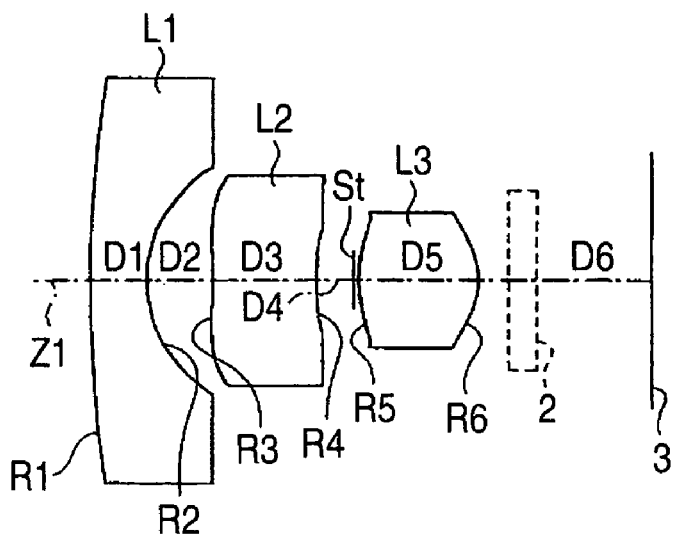
FIG. 11 is a sectional view of a wide-angle imaging lens of Example 10 of the invention.
Figure 12:
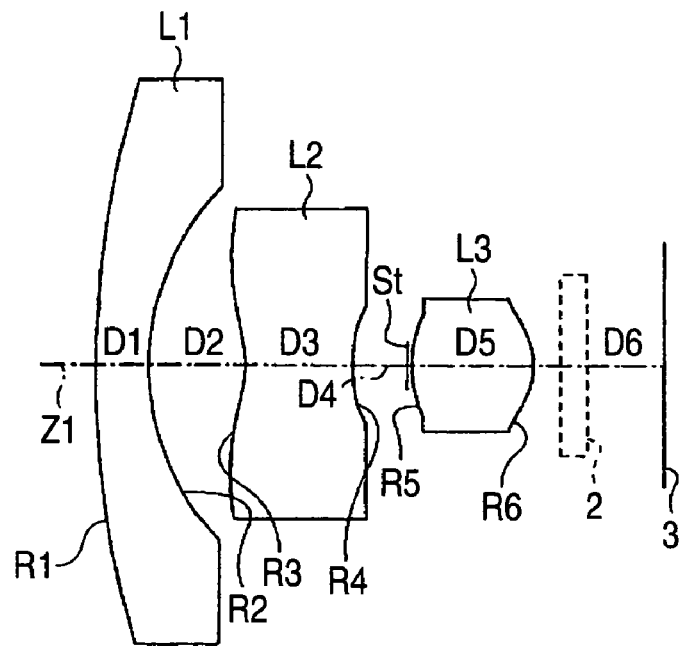
FIG. 12 is a sectional view of a wide-angle imaging lens of Example 11 of the invention.
Figure 13:
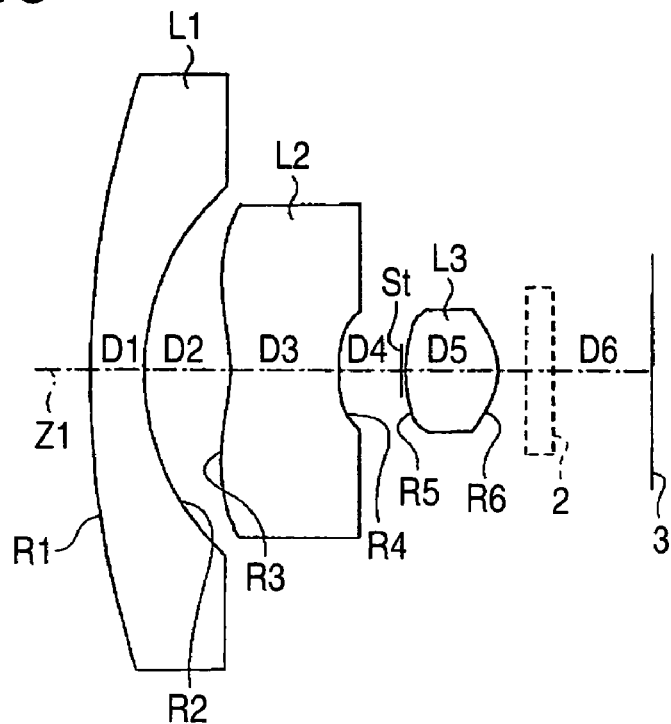
FIG. 13 is a sectional view of a wide-angle imaging lens of Example 12 of the invention.

FIG. 2 is a sectional view of a wide-angle imaging lens of Example 1. FIGS. 14, 15(A), and 15(B) show numerical value data of the wide-angle imaging lens of Example 1. More specifically, FIG. 14 shows its basic lens data and FIG. 15(A) shows data relating to the aspherical surfaces. FIG. 15(B) shows data relating to the parameters included in the above-described condition formulae. The numerical value data shown do not include data relating to the optical member 2 such as a cover glass.

In FIG. 2, symbol Ri represents the radius of curvature of the ith surface (i=1 to 6) as numbered from the object side to the image side (image formation side), the radius of curvature of the object-side end surface being represented by R1. Symbol Di represents the surface interval on the optical axis Z1 between the ith surface and the (i+1)th surface. In the lens data of FIG. 14, in the column "surface Si," symbol Si denotes the ith surface as numbered from the object side to the image side, the object-side end surface being denoted by S1. In the column "radius Ri of curvature," a value of the radius of curvature of the ith surface as numbered from the object side is shown (symbol Ri is the same as shown in FIG. 2). In the column "surface interval Di," a value of the surface interval on the optical axis Z1 between the ith surface Si and the (i+1)th surface Si+1 is shown. The unit of the radius Ri of curvature and the surface interval Di is millimeter (mm). In the columns "refractive index Ndj" and "Abbe number vdj," values of the refractive index and the Abbe number at the d-line (wavelength: 587.6) of the jth optical element (j=1 to 3) as numbered from the object side are shown.

In the wide-angle imaging lens of Example 1 both surfaces of each of the second lens L2 and the third lens L3 are aspherical surfaces. In the basic lens data of FIG. 14, the values of the radii of curvature of these aspherical surfaces are values of the radii of curvature of their portions close to the optical axis Z1. As for the numerical values of the aspherical surface data shown in FIG. 15(A), symbol "E" means that the numerical value following it is an exponent of a power having 10 as a base and the numerical value before "E" is multiplied by the power. For example, "1.0E-02" means $1.0 \times 10^{-2}$.

The data of each aspherical surface are values of the coefficients $B_i$ and KA of the following Equation (A) representing an aspherical surface. That is, the parameter Z means the length (mm) of the perpendicular from a point on the aspherical surface having a height h as measured from the optical axis Z1 to the tangential plane to the aspherical surface at its top (the tangential plane is perpendicular to the optical axis Z1). Each aspherical surface of the wide-angle imaging lens of Example 1 is represented by effectively using the third-order to sixth-order aspherical coefficients $B_i$'s ($B_3$ to $B_6$):

$$Z = C \cdot h^2 / \{1 + (1 - KA \cdot C^2 \cdot h^2)^{1/2}\} + \Sigma B_i \cdot h^i \tag{A}$$

(i=3 to n; n: integer greater than or equal to 3)
where
Z: depth (mm) of a point on the aspherical surface;
h: distance (mm) between the point on the aspherical surface and the optical axis Z1 (i.e., height of the point);
KA: conical constant;
C: paraxial curvature (=1/R; R: paraxial radius of curvature); and
$B_i$: ith-order aspherical coefficient.

FIG. 15(B) shows the values of the parameters included in the above-described condition formulae. In FIG. 15(B), f is the paraxial focal length (mm) of the entire system, fl is the focal length (mm) of the first lens L1, 2ω is the diagonal angle of view, and L and BF are the distances shown in FIG. 1 (the thickness of the optical member 2 such as a cover glass is air-converted). As seen from FIG. 15(B), the parameters of the wide-angle imaging lens of Example 1 fall within the numerical value ranges of the condition formulae.

FIGS. 3-13 are sectional views of wide-angle imaging lenses of Examples 2-12respectively, which are similar to the wide-angle imaging lens of Example 1. Likewise, FIGS. 16, 18, 20, 22, 24, 26, 28, 30, 32, 34, and 36 show basic lens data of the wide-angle imaging lenses of Examples 2-12respectively. FIGS. 17(A), 19(A), 21(A), 23(A), 25(A), 27(A), 29(A), 31(A), 33(A), 35(A), and 37(A) show data relating to the aspherical surfaces of the wide-angle imaging lenses of Examples 2-12respectively. FIGS. 17(B), 19(B), 21(B), 23(B), 25(B), 27(B), 29(B), 31(B), 33(B), 35(B), and 37(B) show data relating to the parameters included in the above-described condition formulae of the wide-angle imaging lenses of Examples 2-12respectively. The parameters of each of the wide-angle imaging lenses of Examples 2-12 fall within the numerical value ranges of the condition formulae.

As in the wide-angle imaging lens of Example 1both surfaces of each of the second lens L2 and the third lens L3 of each of the wide-angle imaging lenses of Examples 2-12 are aspherical surfaces.

In each of the wide-angle imaging lenses of Examples 1-12the object-side surface of the second lens L2 is shaped in such a manner that it is concave (i.e., recessed) near the optical axis Z1 and its negative power decreases as the position goes away from the optical axis Z1. In particular, in the wide-angle imaging lenses of Examples 1, 2, 4, 6, 8, 9, 10, 11and 12 (i.e., the Examples other than Examples 3, 5, 7), the object-side surface of the second lens L2 is shaped in such a manner as to change from a concave surface (i.e., recessed) to a convex surface (i.e., projected toward the object side) in a peripheral portion.

In Examples 1, 2, 10, 11and 12the image-side surface of the second lens L2 is shaped in such a manner that it is concave (i.e., recessed) near the optical axis Z1 and its negative power increases as the position goes away from the optical axis Z1.

In the other Examples (i.e., Examples 3, 4, 5, 6, 7, 8and 9), the image-side surface of the second lens L2 is shaped in such a manner that it is convex (i.e., projected toward the image side) near the optical axis Z1 and its positive power decreases as the position goes away from the optical axis Z1. In particular, in the wide-angle imaging lenses of Examples 8 and 9the image-side surface of the second lens L2 is shaped in such a manner as to change from a convex surface (i.e., projected toward the image side) to a concave surface (i.e., recessed) in a peripheral portion.

In each of the wide-angle imaging lenses of Examples 1-12the third lens L3 is made of a polyolefin-type material that is inexpensive and easy to acquire and whose coefficient of water absorption is about 0.01%. The second lens L2 is made of a polyolefin-type material in Examples 1-11 and a polycarbonate-type material in Example 12.

FIGS. 38(A)-38(D) show the spherical aberration, astigmatism, distortion, and lateral color, respectively, of the wide-angle imaging lens of Example 1. Each aberration diagram shows an aberration curve(s) at the e-line (wavelength: 546.07 nm) used as a reference wavelength. The spherical aberration diagram (FIG. 38(A)) and the lateral color diagram (FIG. 38(D)) also show aberration curves at the C-line (wavelength: 656.27 nm) and the F-line (wavelength: 486.13 nm). In the astigmatism diagram (FIG. 38(B)), a solid-line aberration curve corresponds to the sagittal direction and a broken-line aberration curve corresponds to the tangential direction. The parameter ω represents the half angle of view.

Likewise, FIGS. 39(A)-39(D) show the aberrations of the wide-angle imaging lens of Example 240(A)-40(D) show the aberrations of the wide-angle imaging lens of Example 341 (A)-41(D) show the aberrations of the wide-angle imaging lens of Example 442(A)-42(D) show the aberrations of the wide-angle imaging lens of Example 543(A)-43(D) show the aberrations of the wide-angle imaging lens of Example 644 (A)-44(D) show the aberrations of the wide-angle imaging lens of Example 745(A)-45(D) show the aberrations of the wide-angle imaging lens of Example 846(A)-46(D) show the aberrations of the wide-angle imaging lens of Example 947 (A)-47(D) show the aberrations of the wide-angle imaging lens of Example 1048(A)-48(D) show the aberrations of the wide-angle imaging lens of Example 11and 49(A)-49(D) show the aberrations of the wide-angle imaging lens of Example 12.

As seen from the above numerical value data and aberration diagrams, in each Example, a compact, lightweight wide-angle lens system which exhibits good optical performance can be realized at a low cost because the aspherical surface shapes, the lens materials, etc. are optimized by using a small number of (i.e., three) lenses.

The invention is not limited to the above embodiment and Examples and various modifications are possible. For example, the values of the radii of curvature of the lens surfaces, the surface intervals, the refractive indices of the lenses, etc. are not limited to the values used in the above numerical value Examples and may have other values.

The present application claims foreign priority based on Japanese Patent Application No. JP2005-306771 filed Oct. 21, 2005the contents of which is incorporated herein by reference.

What is claimed is:

1. A wide-angle imaging lens comprising: in order from an object side of the wide-angle imaging lens,
   a first lens of a negative meniscus lens made of a material having an Abbe number of 40 or more, the first lens having a convex surface on the object side thereof
   a second lens, at least one surface of which is an aspherical surface, the second lens having a negative power, wherein an object-side surface of the second lens is shaped to be a concave surface on an optical axis of the second lens;
   an aperture stop;
   a third lens of a positive lens made of a material having an Abbe number of 50 or more, the third lens having a convex surface on an image side thereof and at least one surface of the third lens being an aspherical surface,
   the lenses within said wide-angle imaging lens consisting of said first lens, said second lens and said third lens.

2. The wide-angle imaging lens according to claim 1, wherein both surfaces in each of the second lens and the third lens are aspherical surfaces.

3. The wide-angle imaging lens according to claim 1, wherein each of the second lens and the third lens is made of plastics.

4. The wide-angle imaging lens according to claim 1, wherein each of the second lens and the third lens is made of a material having a coefficient of water absorption of 0.3% or less.

5. The wide-angle imaging lens according to claim 1, wherein the third lens is made of a polyolefin material.

6. The wide-angle imaging lens according to claim 1, which has a diagonal angle of view of 140° or more.

7. A wide-angle imaging lens comprising: in order from an object side of the wide-angle imaging lens, a first lens of a negative meniscus lens made of a material having an Abbe number of 40 or more, the first lens having a convex surface on the object side thereof a second lens, at least one surface of which is an aspherical surface, wherein an object-side surface of the second lens is shaped to be a concave surface on an optical axis of the second lens;

an aperture stop;

a third lens of a positive lens made of a material having an Abbe number of 50 or more, the third lens having a convex surface on an image side thereof and at least one surface of the third lens being an aspherical surface, the lenses within said wide-angle imaging lens consisting of said first lens, said second lens and said third lens, and wherein an object-side surface of the second lens is shaped in such a manner as to be a concave surface on an optical axis of the second lens and to decrease in negative power of the object-side surface as a position on the object-side surface goes away from the optical axis.

8. The wide-angle imaging lens according to claim 7, wherein the object-side surface of the second lens is shaped in such a manner as to change from the concave surface to a convex surface in a peripheral portion of the object-side surface as the position on the object-side surface goes away from the optical axis.

9. The wide-angle imaging lens according to claim 7, wherein an image-side surface of the second lens is shaped in such a manner as to be a concave surface on optical axis and to increase in negative power of the image-side surface as a position on the image-side surface goes away from the optical axis.

10. The wide-angle imaging lens according to claim 7, wherein an image-side surface of the second lens is shaped in such a manner as to be a convex surface on the optical axis and to decrease in positive power of the image-side surface as a position on the image-side surface goes away from the optical axis.

11. The wide-angle imaging lens according to claim 8, wherein an image-side surface of the second lens is shaped in such a manner as to be a concave surface on optical axis and to increase in negative power of the image-side surface as a position on the image-side surface goes away from the optical axis.

12. The wide-angle imaging lens according to claim 8, wherein an image-side surface of the second lens is shaped in such a manner as to be a convex surface on the optical axis and to decrease in positive power of the image-side surface as a position on the image-side surface goes away from the optical axis.

13. The wide-angle imaging lens according to claim 10, wherein the image-side surface of the second lens is shaped in such a manner as to change from the convex surface to a concave surface in a peripheral portion of the image-side surface as the position on the image-side surface goes away from the optical axis.

14. The wide-angle imaging lens according to claim 1, which satisfies:

$$3<L/BF<7$$

where L is a distance between an object-side surface of the first lens located at the optical axis and an imaging device surface; and BF is a distance between an image-side surface of the third lens located at the optical axis and the imaging device surface.

15. The wide-angle imaging lens according to claim 1, which satisfies:

$$2<|f1/f|<11$$

where f is a focal length of the wide-angle imaging lens; and f1 is a focal length of the first lens.

16. The wide-angle imaging lens according to claim 1, which satisfies:

$$L/(2\omega x)<2.3$$

where L is a distance between an object-side surface of the first lens located at the optical axis and an imaging device surface; x is a maximum height of an image; and $2\omega$ is a diagonal angle of view in radian.

17. The wide-angle imaging lens according to claim 7, which satisfies:

$$3<L/BF<7$$

where L is a distance between an object-side surface of the first lens located at the optical axis and an imaging device surface; and BF is a distance between an image-side surface of the third lens located at the optical axis and the imaging device surface.

18. The wide-angle imaging lens according to claim 7, which satisfies:

$$2<|f1/f|<11$$

where f is a focal length of the wide-angle imaging lens; and f1 is a focal length of the first lens.

19. The wide-angle imaging lens according to claim 7, which satisfies:

$$L/(2\omega x)<2.3$$

where L is a distance between an object-side surface of the first lens located at the optical axis and an imaging device surface; x is a maximum height of an image; and $2\omega$ is a diagonal angle of view in radian.

* * * * *